United States Patent
Rowlands et al.

(10) Patent No.: US 7,912,051 B1
(45) Date of Patent: Mar. 22, 2011

(54) TECHNIQUES FOR PORT VIRTUALIZATION

(75) Inventors: Scott Rowlands, Mountain View, CA (US); Brian Riordan, Newton, MA (US); Arieh Don, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 193 days.

(21) Appl. No.: 12/317,158

(22) Filed: Dec. 19, 2008

(51) Int. Cl.
*H04L 12/28* (2006.01)

(52) U.S. Cl. ........ 370/389; 370/230; 370/419; 709/217; 709/213

(58) Field of Classification Search .......... None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 7,353,305 B2 * | 4/2008 | Pangal et al. | 710/74 |
| 2004/0143639 A1 * | 7/2004 | Rangan et al. | 709/212 |
| 2004/0143642 A1 * | 7/2004 | Beckmann et al. | 709/213 |
| 2006/0013222 A1 * | 1/2006 | Rangan et al. | 370/389 |
| 2006/0230218 A1 * | 10/2006 | Warren et al. | 710/315 |
| 2006/0242230 A1 * | 10/2006 | Crespi et al. | 709/230 |
| 2008/0028034 A1 * | 1/2008 | Currid et al. | 709/217 |
| 2009/0307378 A1 * | 12/2009 | Allen et al. | 710/4 |
| 2010/0017497 A1 * | 1/2010 | Brown et al. | 709/217 |

OTHER PUBLICATIONS

"*NPIV Functionality Profile*", Retrieved from: www.t11.org/ftp/t11/pub/fc/da/02-643v0.pdf; Oct. 16, 2002; 02-643v0; 7 pages.
"*World Wide Name*", Wikimedia Foundation, Inc.; Retrieved from: http://en.wikipedia.org/wiki/World_Wide_Name.com; Dec. 17, 2008; 2 pages.
"*NPIV*", Wikimedia Foundation, Inc.; Retrieved from: http://en.wikipedia.org/wiki/NPIV.com; Dec. 9, 2008; 1 page.
"*What is NPIV?*", Hewlett-Packard Development Company, L.P.; Retrieved from: http://h71028.www7.hp.com/eNewsletter/cache/584543-0-0-224-121.html.com; 2008; 1 page.

* cited by examiner

*Primary Examiner* — Bob A Phunkulh
(74) *Attorney, Agent, or Firm* — Muirhead and Saturnelli, LLC

(57) ABSTRACT

Described are techniques for providing a plurality of logical connections over a physical connection. A login frame is transmitted for each of the plurality of logical connections from an initiator port to a target port. The login frame includes a payload comprising a first identifier of a virtual port associated with the initiator port. Upon receiving the login frame, a login acceptance frame is transmitted from the target port to the initiator port and includes a second identifier of a virtual port associated with said target port in the payload. The initiator and target ports are included in hardware components in compliance with a version of a protocol that does not support multiple logical connections over a same physical connection. Each logical connection is established as a result of processing including transmitting a login frame and a login acceptance frame.

20 Claims, 19 Drawing Sheets

TECHNIQUES FOR PORT VIRTUALIZATION

BACKGROUND

1. Technical Field

This application generally relates to port virtualization and more particularly to techniques for providing one or more logical or virtual connections over a single physical connection.

2. Description of Related Art

Computer systems may include different resources used by one or more host processors. Resources and host processors in a system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In connection with testing in a data storage system environment, it may be desirable to be able to test upper or maximum limits. For example, a maximum number of logical connections may be allowable between one or more hosts and a data storage system and it may be desirable to perform testing using conditions with the maximum number of connections. In data storage system environments in accordance with one version of a protocol or standard, such as the Fibre Channel (FC) protocol, only a single logical or virtual connection may be allowed for each physical connection such as between any pair of FC ports (e.g. such as a port of a host and a port of a data storage system). In such an environment, a large number of physical hosts and associated FC adapters (FAs) may be required to perform appropriate testing. The number of FAs and hosts required for testing the maximum number of logical connections allowable, as well as the time to configure such FAs and/or hosts, may not be practical or feasible to provide in a testing environment in accordance with FAs supporting the foregoing version of the protocol.

Subsequent or later versions of standards and protocols, such as the FC protocol, may provide support for multiple logical connections over a same physical connection. For example, N-Port ID Virtualization (NPIV) is part of a more recent version of the industry standard FC protocol which provides for multiple logical connections over a same physical connection between two physical FC ports. Hardware, such as ASICs (application-specific integrated circuits) utilized by vendors in such FAs, may provide support in accordance with the revised FC protocol and therefore support multiple logical connections over a same physical connection. FAs of the hosts may include the appropriate ASICs and other hardware to provide the foregoing virtualization in accordance with NPIV. However, data storage systems and/or hosts available for use in connection with the testing environment may not include the more up-to-date FAs which provide the foregoing virtualization in accordance with supporting NPIV. FAs available for use in the testing environments may rather not support NPIV and may be in accordance with the earlier FC protocol providing only a single logical connection over a physical connection.

As such, it may be desirable to utilize techniques in connection with testing environments as well as other purposes for emulating multiple logical connections over a single physical connection without requiring use of hardware that provides such support such as, for example, without requiring use of FAs or other hardware which provide support for NPIV in accordance with the FC protocol.

SUMMARY OF THE INVENTION

In accordance with one aspect of the invention is a method for providing a plurality of logical connections over a physical connection. The plurality of logical connections over the physical connection are established by transmitting a login frame for each of the plurality of logical connections from an initiator port to a target port. The login frame includes a header comprising routing information identifying the physical connection between the initiator port and the target port and a payload comprising an identifier of a virtual port associated with the initiator port. The initiator port is included in a hardware component of an initiator system and the hardware component is in compliance with a version of a protocol that does not support multiple logical connections over a same physical connection. The protocol may be a version of a fibre channel communications protocol. The initiator system may be a data storage system and said target port is included in another data storage system. The method may include, for each of said plurality of logical connections, selecting a virtual port associated with said initiator port by selecting an world wide name for said virtual port using code executing on the initiator system which is in communication with said hardware component. The another data storage system may include a second hardware component including said target port and said second hardware component may be in compliance with a version of the protocol that does not support multiple logical connections over a same physical connection. The routing information may be used by a switch to route transmissions over the physical connection and said identifier of said virtual port may not be used by said switch to route transmissions over the physical connection. The identifier of the virtual port may be a world wide name. The routing information may include a first identifier associated with said initiator port and a second identifier associated with said target port, said first identifier and said second identifier being assigned by a switching fabric used to facilitate communications between said initiator port and said target port. An I/O frame may be sent over the physical connection. The I/O frame may include a header comprising routing information identifying said physical connection and an originator exchange identifier. Code executing on a target system including said target port may use said originator exchange identifier to determine upon which one of said plurality of logical connections said I/O frame is sent. An I/O frame may be sent over the physical connection. The I/O frame may include a header comprising routing information identifying said physical connection and an originator exchange identifier. Code executing on a target system including said target port may implicitly determine on which one of said plurality of logical connections said I/O frame is sent in accordance with a sequential ordering in which said logical connections has been previously established. The target system may track an order in which login frames establishing the plurality of logical connections are processed by said target port. The order may be the sequential ordering used to implicitly determine on which one of said plurality of logical connections said I/O frame is sent. The I/O frame may include a responder exchange identifier used by a target system including said target port to track state information associated with a transaction. The originator exchange identifier may be used by said initiator system to track state information associated with said transaction. The responder exchange identifier may be determined by said target system and said originator exchange identifier may be determined by said initiator system. Code executing on the initiator system in communication with said hardware component may track which logical connections that are established are associated with each physical connection. Code executing on the target system in communication with said second hardware component may track which logical connections that are established are associated with each physical connection. A logout frame may be sent from said initiator port to said target port to logout at least a portion of said logical connections. When a first of said logical connections is logged out, the first logical connection may be removed from information maintained on both the initiator system and a target system including said target port for the physical connection so that a world wide name identifying a virtual port of said first logical connection for the initiator port is no longer associated with the initiator port for the physical connection. A predetermined number of originator exchange identifiers may be associated with each of said plurality of logical connections by code executing in said initiator system as part of processing prior to transmitting a first login frame to said target port for said each logical connection. A predetermined number of responder exchange identifiers may be associated with said each logical connection by code executing in a target system including said target port as part of processing said login frame received from said initiator system to establish a logical connection. Each of said plurality of logical connections over the physical connection may be defined by a first identifier of a first virtual port associated with said initiator port and a second identifier of a second virtual port associated with said target port. Each logical connection may be established as a result of transmitting a first login frame from the initiator port to the target port where the login frame includes a payload with said first identifier. In response to receiving said first login frame, a first login acceptance frame may be transmitted from said target port to said initiator port wherein said first login acceptance frame includes a payload with said second identifier.

In accordance with another aspect of the invention is a computer readable medium comprising executable code stored thereon for providing a plurality of logical connections over a physical connection. The computer readable medium comprises executable code for establishing the plurality of logical connections over the physical connection by transmitting a login frame for each of the plurality of logical connections from an initiator port to a target port. The login frame includes a header comprising routing information identifying the physical connection between the initiator port and the target port and a payload comprising an identifier of a virtual port associated with the initiator port. The initiator port is included in a hardware component of an initiator system and the hardware component is in compliance with a version of a protocol that does not support multiple logical connections over a same physical connection.

In accordance with another aspect of the invention is a computer readable medium comprising executable code stored thereon for providing a plurality of logical connections over a physical connection. The computer readable medium comprises executable code for transmitting a login frame for each of the plurality of logical connections from an initiator port to a target port. The login frame includes a header comprising routing information identifying the physical connection between the initiator port and the target port and a payload comprising a first identifier of a virtual port associated with the initiator port. The initiator port is included in a hardware component of an initiator system and the hardware component is in compliance with a version of a protocol that does not support multiple logical connections over a same physical connection. Upon receiving the login frame for said each logical connection, a login acceptance frame is transmitted from the target port to the initiator port. The login acceptance frame includes a header comprising the routing information and a payload comprising a second identifier of a virtual port associated with the target port. The target port may be included in a second hardware component of a target system and the second hardware component is in compliance with a version of a protocol that does not support multiple logical connections over a same physical connection. Said each logical connection is established as a result of processing including transmitting the login frame and the login acceptance frame. A relogin may be determined by the target system for an existing logical connection and may result in implicitly aborting any outstanding I/O transactions for the existing logical connection.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
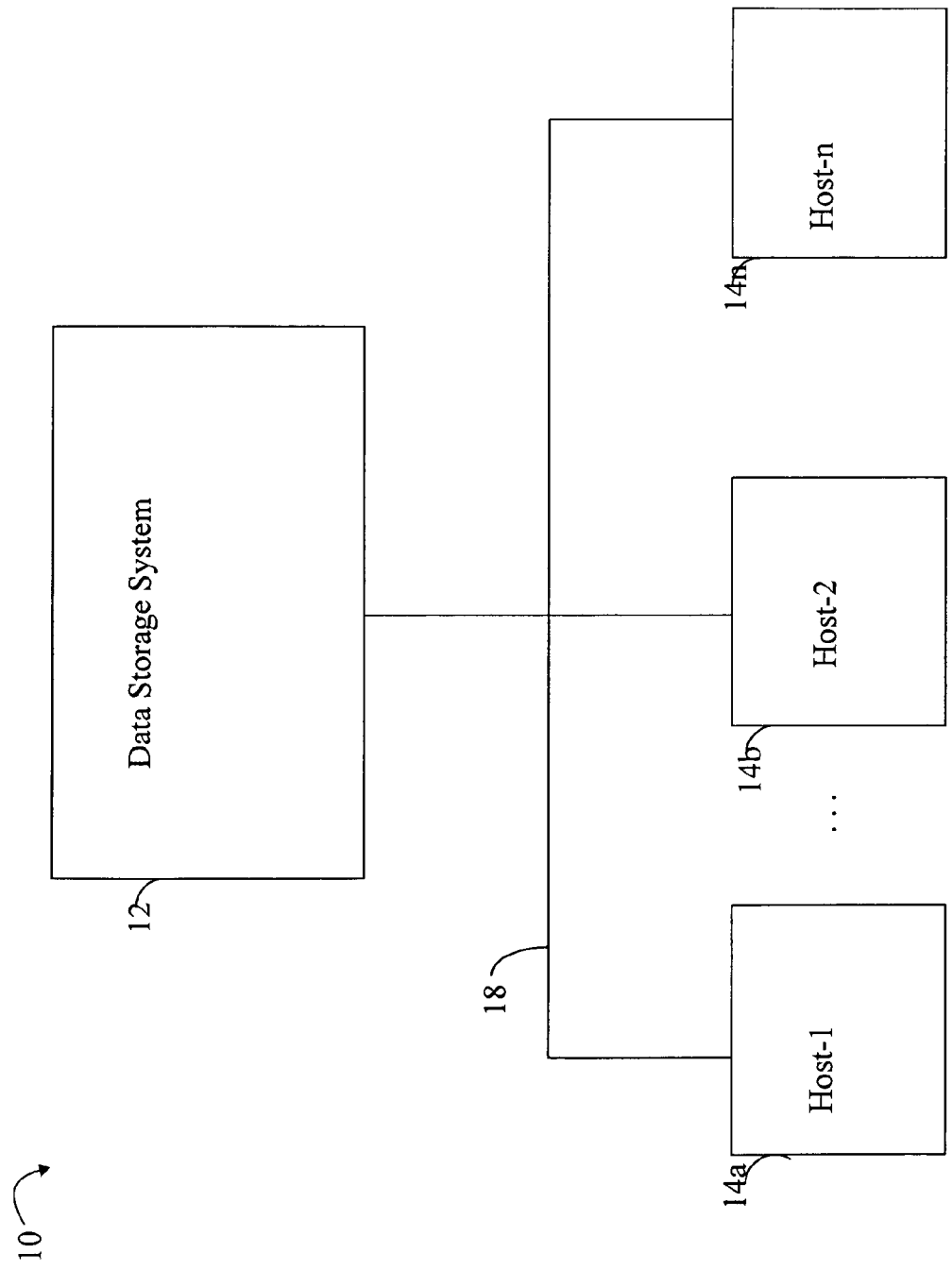
FIG. 1 is an example of an embodiment of a computer system according to the present invention.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
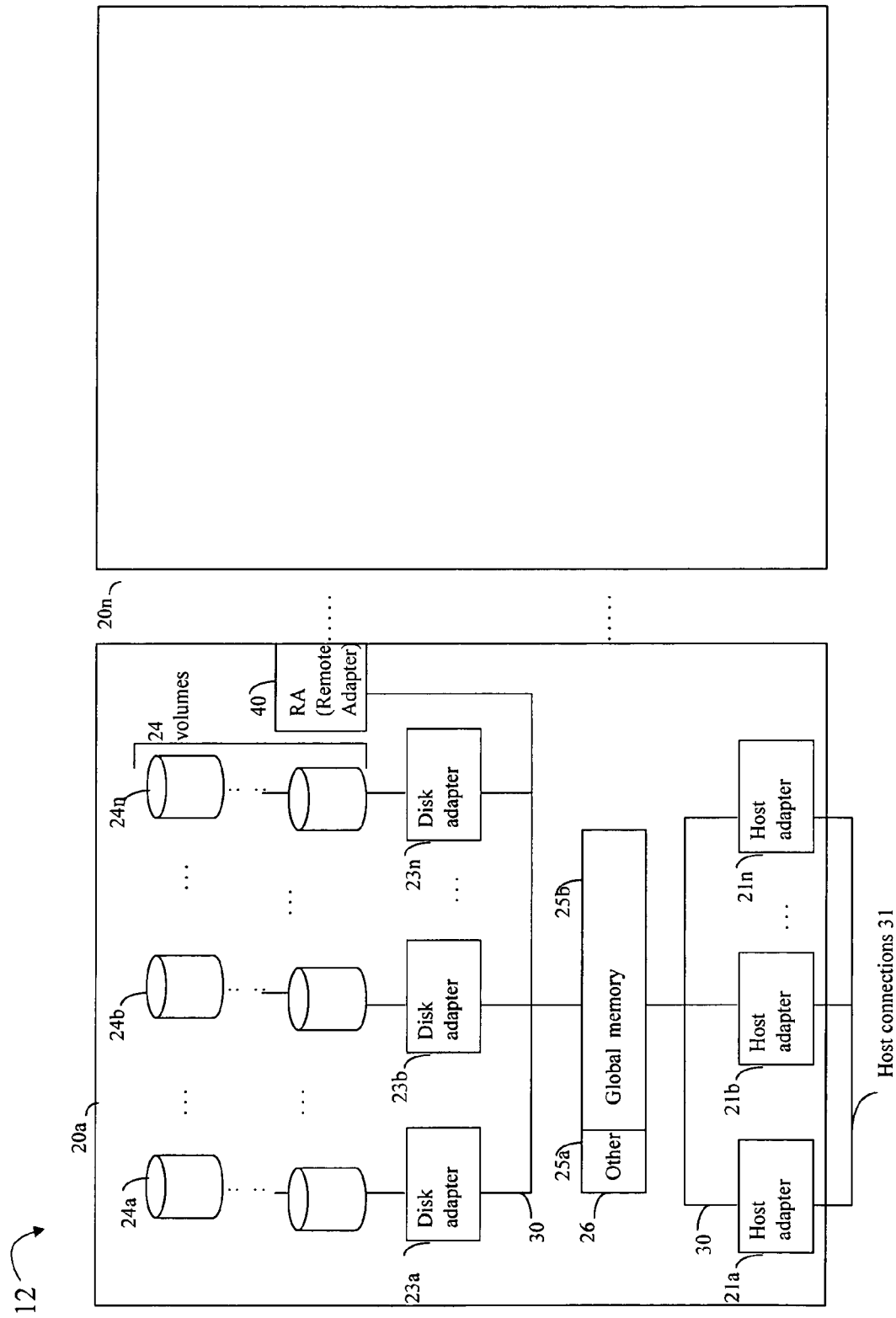
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein.

One or more internal logical communication paths may exist between the DA's, the RA's, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. Data residing on an LV may be accessed by the DA following a data request in connection with I/O operations that other directors originate.

Figure 2B:
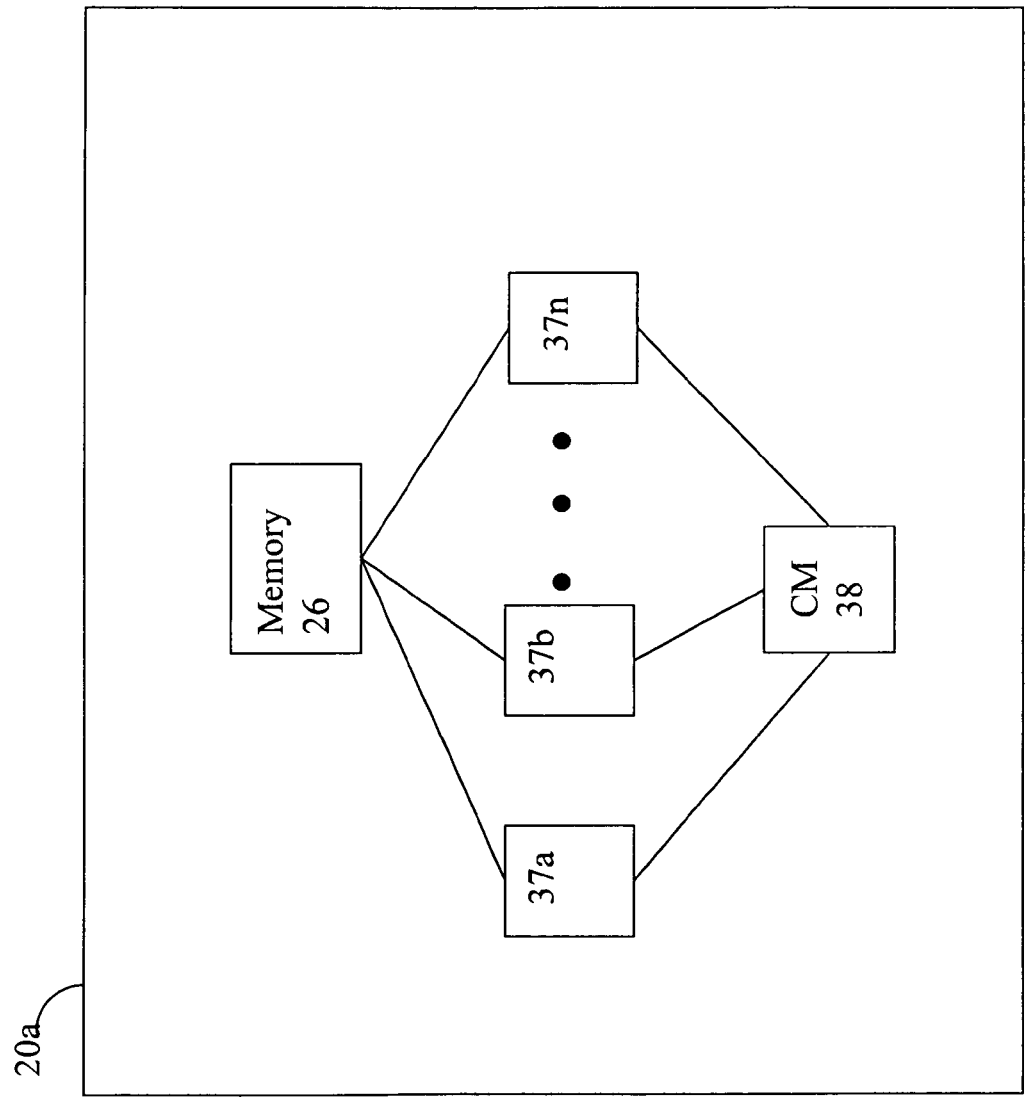
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In a data storage system environment such as illustrated in FIG. 1, a maximum number of logical connections may be possible between one or more hosts and a data storage system. As such, when performing testing for the data storage system, it may be desirable to be able to provide a testing environment which allows test conditions under which the maximum number of logical connections exists. In data storage system environments in accordance with one version of a protocol or standard, such as the Fibre Channel (FC) protocol, only a single logical or virtual connection may be allowed for each physical connection such as between any pair of FC ports (e.g. such as a port of a host and a port of a data storage system). In such an environment, a large number of physical hosts and associated FC adapters (FAs) may be required to perform appropriate testing. The number of FAs and hosts including those FAs needed for testing the maximum number of logical connections allowable, as well as the time to configure such FAs and/or hosts, may not be practical or feasible to provide in a testing environment in accordance with FAs supporting the foregoing version of the protocol.

Subsequent or later versions of standards and protocols, such as the FC protocol, may provide support for multiple logical connections over a same physical connection. For example, N-Port ID Virtualization (NPIV) is part of a more recent version of the industry standard FC protocol which provides for multiple logical connections over a same physical connection between two physical FC ports. Hardware, such as ASICs (application-specific integrated circuits) utilized by vendors in such FAs, may provide support in accordance with the revised FC protocol and therefore support multiple logical connections over a same physical connection. FAs of the hosts may include the appropriate ASICs and other hardware to provide the foregoing virtualization in accordance with NPIV. However, data storage systems and/or hosts available for use in connection with the testing environment may not include the more up-to-date FAs which provide the foregoing virtualization in accordance with supporting NPIV. FAs available for use in the testing environments may rather not support NPIV and may be in accordance with the earlier FC protocol providing only a single logical connection over a physical connection.

As such, it may be desirable to utilize techniques as described herein in connection with testing environments as well as other purposes for emulating multiple logical connections over a single physical connection without requiring use of hardware that provides such support such as, for example, without requiring use of FAs or other hardware which provide support for NPIV in accordance with the FC protocol. What will be described in following paragraphs are techniques that may be used to provide support for multiple logical connections over a single physical connection between two FC ports through emulation. Thus, the techniques described herein may be used in an embodiment in which the FAs do not support NPIV. In other words, support for multiple logical connections on a single physical connection is not provided using the hardware of the FAs but rather using other software embodying the techniques herein.

In typical testing environments, the host (as well as a component thereof such as the FA) may be characterized as an initiator, originator or source with respect to the foregoing logical connections. The host, as the initiator, sends requests to a data storage system (as well as a particular component thereof such as another FA having a port with a network address) characterized as a target, destination, receiver, or responder. In one embodiment in connection with techniques described herein as will be illustrated in FIG. 3, a first data storage system may function as an initiator rather than a host which communicates with a second data storage system acting as the target. Each physical connection may be between a first endpoint which a port of an FA in the first data storage system and a second endpoint which is a port of an FA in the second data storage system. In connection with techniques herein, initiator code (included in the first data storage system and in communication with an initiator FA) may be used to create multiple logical connections to a target FA port of the second data storage system so that multiple logical or virtual ports are associated with the single physical target FA port of the second or target data storage system. Although the first data storage system embodies functionality as described herein as the initiator for logical connections to the second data storage system, the initiator functionality described in connection with the techniques herein may also be implemented in other components and systems in communication with the second data storage system (e.g., acting as the target).

Figure 3:
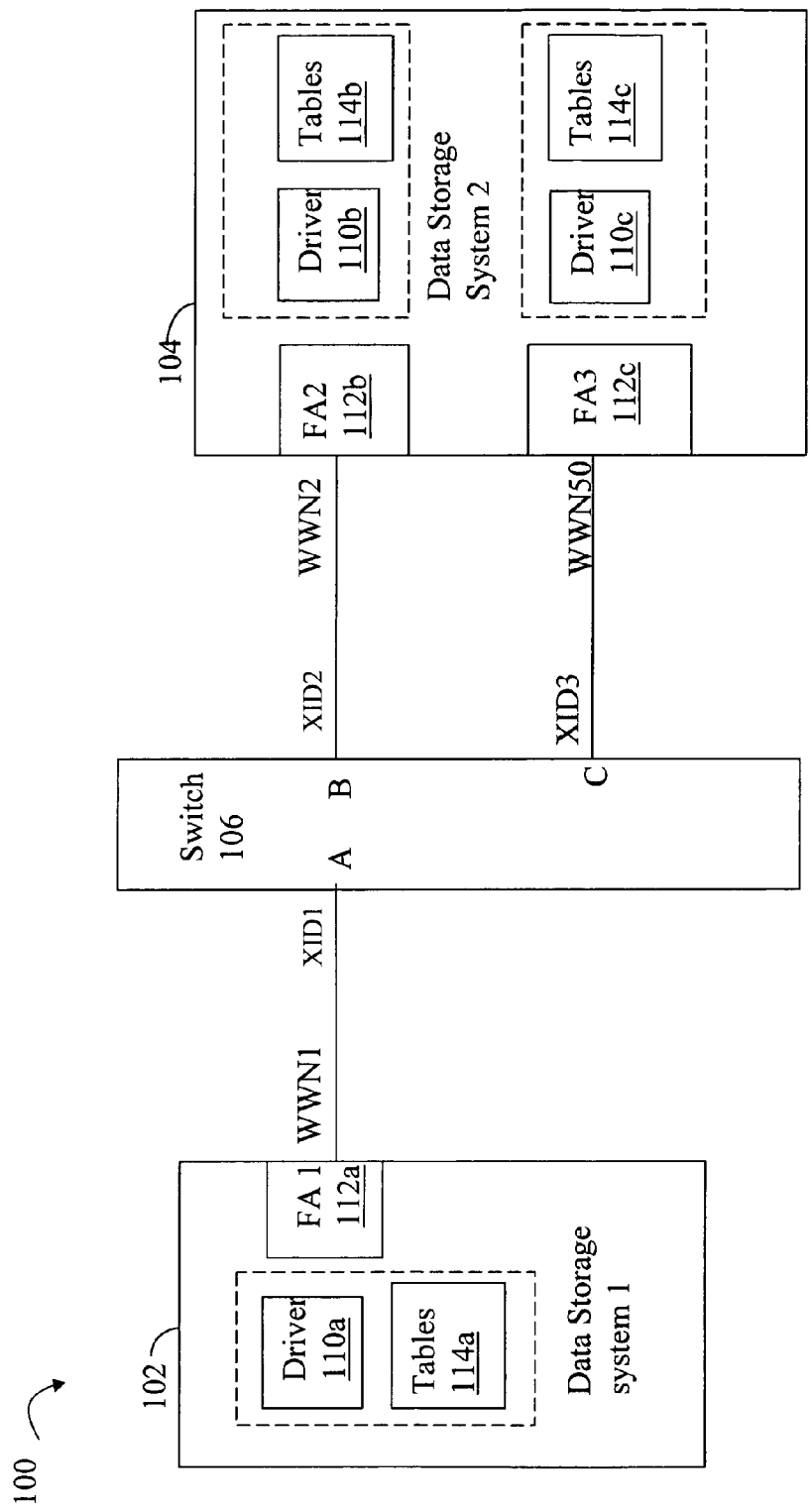
FIG. 3 is a simplified illustration of an example of an embodiment of a system that may be used in connection with the techniques described herein.

Referring to FIG. 3, shown is an example of an embodiment of a system 100 that may be used in connection with the techniques described herein. It should be noted that the embodiment illustrated in FIG. 3 is a simplified view of components of a system and environment as generally illustrated in FIGS. 1 and 2A, for example, including only some detail of the data storage systems 102 and 104 for the sake of illustration.

Included in the system 100 are data storage systems 102 and 104 and a switch 106. Each of the data storage systems 102 and 104 may communicate with each other over switch 60 through one or more Fibre Channel Adapters (FAs) of each of the data storage systems 102 and 104. In this example, the data storage system 102 includes FA1 112a, driver 110a and one or more tables of information 114a used by driver 110a. Driver 110a may be used to facilitate communications between FA1 112a and other components (not illustrated) of the data storage system 102 in connection with techniques herein so that other components and software at higher levels above the driver 110a may utilize multiple logical connections over a single physical connection. Data storage system 104 includes multiple FAs 112b and 112c. Data storage system 104 includes driver 110b which may use one or more tables of information 114b. Driver 110b may be used to facilitate communications between FA2 112b and other components (not illustrated) of the data storage system 104 in connection with techniques herein. Data storage system 104 also includes driver 110c which may use one or more tables of information 114c. Driver 110c may be used to facilitate communications between FA3 112c and other components (not illustrated) of the data storage system 104 in connection with techniques herein.

Driver 110a and tables 114a may be stored in a form of memory. Code of the driver may be implemented as microcode or firmware which uses data of the tables 114a also stored in the memory. Code of the driver 110a may be executed by a processor and may be used in connection with communicating with FA1 112a. Similarly, driver 110b and tables 114b may be implemented in firmware or microcode and used to facilitate communications with FA2 112b. Furthermore, driver 110c and tables 114c may be implemented in firmware or microcode and used to facilitate communications with FA2 112c. Information as may be included in tables 114a-114c is described in more detail in following paragraphs.

Each of the FAs 112a, 112b and 112c may have one or more ports where each port may be used an endpoint for both a physical communication connection and also one or more logical connections over the single physical communication connection. A physical connection between data storage system 102 and 104 may be formed between a port of FA 1 112a to a port of FA 112b or a port of FA 112c. Each port of the FAs may acquire its own unique WWN (World Wide Name) different from all other ports in the switching fabric when connected to the switch 106 comprising the switching fabric.

Within the switching fabric that may be included in an embodiment is a name server referred to as the SNS (storage name server) name server (such as may be included in the switch 106 or another component connected thereto). The SNS name server may be used in connection with implementing and using the WWNs as described herein. The SNS name server keeps track of which ports are active or connected to a network which may include one or more switches, and also keeps track of the particular physical address associated with each WWN. The switching fabric may be used in connection with facilitating communications between one or more data storage systems, and one or more hosts connected thereto, as described elsewhere herein. The one or more switches, for example, as illustrated in connection with figures herein, may be part of a network, such as a storage area network or SAN, used to facilitate communications between one or more data storage systems, hosts, and other devices connected thereto.

The FA, and/or driver in communication therewith, may use information stored on its associated data storage system. The information may be stored in any of a variety of different forms which are represented herein as including one or more tables (such as represented by 114a-114c). The FA and/or code of the driver may use a table which includes a list of ports on that particular FA. This table contains the physical port address of a particular FA and the particular WWN name associated with that port. When a port comes on line during its initialization processing, that port communicates to the SNS name server its WWN. Thus, the SNS name server may be used in tracking which ports having a WWN are currently active or may be used in connection with communications. It should be noted that tables of information used by an FA may be stored on memory local to the FA. Other tables of information, such as used by the driver in communication with the FA, may be stored in other memory of the data storage or other system including the FA and driver. Portions of the information included in tables used by the FA (e.g., tables which may be stored on memory local to, and used exclusively by, the FA) may be duplicated in other tables (e.g., such as may be used by the driver code) depending on where the tables are stored. For example, a first table used by an FA may be stored in memory local to the FA so that only the FA and associated processor can use and access the local memory. A second table used by driver code may be located in other memory if such driver does not have access to the local memory.

In one embodiment as described herein, commands may be used in connection with obtaining the necessary information used for performing a discovery process as related to WWNs. The switching fabric (including the SNS name server and switch 106) may be queried, such as by each FA issuing a request to the switch 106 to return all of the WWNs of the active ports which are currently on line and visible to the requestor (or querying FA) so that the querying FA may attempt to establish a connection thereto. Additionally, for each WWN associated with a port of an FA, another identifier, referred to as an XID herein and assigned by the switch 106, identifies a particular port of the switch used to facilitate communications with the port of the FA. In other words, the XID identifies the switch port which communicates with a particular FA port having an associated WWN. As part of discovery processing performed by each FA querying the switch (or more generally the switching fabric), the FA may also receive the foregoing XID associated with each visible FA's port WWN. As result of discovery processing, the FA may build a table identifying which WWN and XID are associated with each visible or reachable FA port. In examples illustrated herein for illustration, each FA has a single physical port although an embodiment may utilize FAs including more than a single physical port.

In the example 100, the port of FA1 112a is illustrated as being associated with WWN1 and XID1, the port of FA2 112b is illustrated as being associated with WWN2 and XID2, and the port of FA3 112c is illustrated as being associated with WWN50 and XID3. The discovery process performed by each FA returns information regarding which other FA ports are visible from the requesting FA where the information includes each visible port's XID and WWN.

Figure 4:
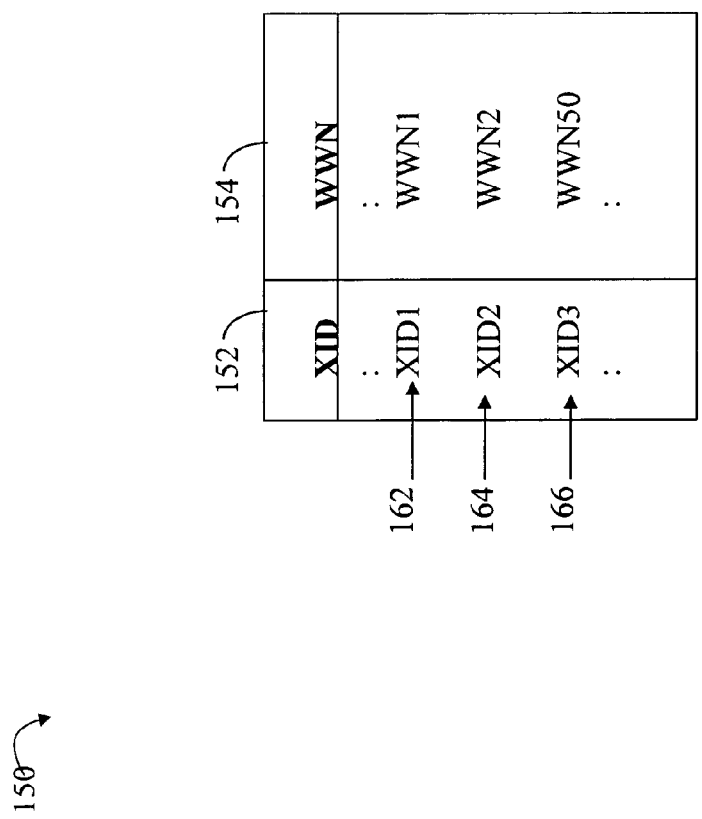
FIG. 4 is an example of a table containing information as a result of discovery processing.

Referring to FIG. 4, shown is an example of a table of information as may be obtained by FA1 112a as a result of performing discovery processing. In this example 150, the FA1 112a may query the switch 106 for information regarding all visible FA ports so that FA1 112a may build information in the table 150 regarding possible locations with which to establish a communication connection such as for use when communicating with the target data storage system 104. The information of 150 obtained as a result of discovery processing by FA1 112a includes a list of XIDs 152 and corresponding WWNs 154 for each visible FA port. In this example, element 162 represents information regarding FA1 112a itself, element 164 represents information regarding FA2 112b and 166 represents information regarding FA3 112c, all of FIG. 3.

It should be noted that details (e.g., a particular number of FAs in a data storage system, particular WWNs and XIDs, and the like) set forth herein for purposes of illustration should not be construed as a limitation of techniques herein.

In a manner similar to that as described regarding FA1 112a of FIG. 3, each of the FAs 112b and 112c may also perform discovery processing to build its own table of information of WWNs and corresponding XIDs for those FA ports visible from the requesting FA port.

It should be noted that an XID as described herein and associated with each FA port in communication with the switch may also be referred to as an identifier used for routing by the switch. Also each XID may also be referred to, such as in the context of the FC protocol, as an SID (source ID) when the XID is associated with an initiator or source of a connection, and as DID (destination ID) when the XID is associated with the target or destination of a connection. Other standards and protocols and other environments using the techniques herein may use other information, alone or in combination with that as described herein, in connection with routing messages.

Figure 5:
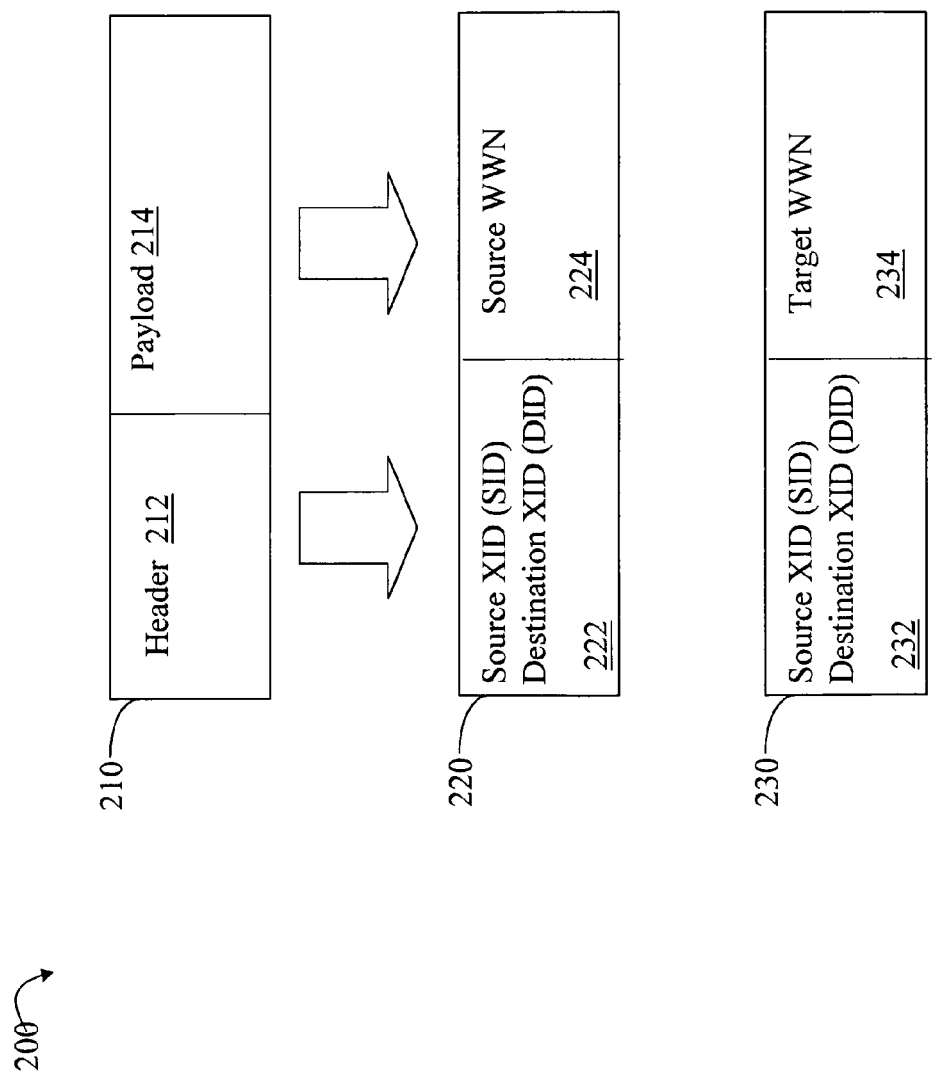
FIGS. 5, 6A, 6B and 7 are examples of frames that may be transmitted in accordance with techniques herein.

Referring to FIG. 5, shown is an example of a message frame as may be exchanged between the initiator or source and target data storage systems. The example 200 includes a generalized format 210 of a frame exchanged between the data storage systems 102 and 104. The format 210 includes a header portion 212 and a payload or data portion 214 in accordance with the particular communications protocol such as a version of the FC protocol which does not include NPIV. The header portion 212 may include information, for example, used in routing the frame from the initiator or source system 102 to the target data storage system 104 through switch 106. The payload 214 may include data for the particular frame type being transmitted.

In following paragraphs, different types of frames are described which have the same general format 210. It should be noted that a frame or message exchanged between data storage systems may have other information than as illustrated in 210 in accordance with the particular protocol and version thereof. For example, each frame may also include beginning and ending delimiters to partition the frame, information to identify the type of frame (e.g., login frame, I/O frame), a CRC (cyclic redundancy check) or other value as may be used in connection with transmission error detection, and also other optional information.

At some point in time with reference back to FIG. 3, the initiator data storage system 102 decides to open a logical connection to the target data storage system 104 by sending a login request from 102 to 104. The login request may be in the form of a login frame as further illustrated in 220. Element 220 is a particular instance of the general format of 210. The header 222 of the login frame 220 may include the XID of the initiator or source (SID of an FA port on data storage system 102) and the XID of the destination or target (DID of an FA port on data storage system 104). The payload 224 of the login frame 220 may include the WWN of the source. It should be noted that the frame 220 may include other information than those pointed out for use in connection with techniques herein. With the login frame 220, the switch uses the routable ID information included in the header 222 to route the frame from the originator to the target port in accordance with the SID and DID of 222. In one embodiment in accordance with a version of the FC protocol, the login frame 220 may be an instance of a PLOGI frame as specified in the standard. An embodiment as described herein may include code executing in the initiator or source system (such as code of one or more drivers) to select a source WWN used for a logical connection being established with a particular login frame instance.

In response to receiving a login frame, the target system (or rather target FC denoted by the DID of the received login frame), may transmit a login acceptance or response message in the form of a login response or acceptance frame as further illustrated in 230. Element 230 is a particular instance of the general format of 210 denoted a login acceptance or response frame. The header 232 of the login acceptance or response frame 230 may include the XID of the initiator or source (SID of an FA port on data storage system 102) and the XID of the destination or target (DID of an FA port on data storage system 104). The payload 234 of the login acceptance frame 230 may include the WWN of the target for the logical connection. It should be noted that the frame 230 may include other information than as pointed out for use in connection with techniques herein. With the frame 230, the switch uses the routable ID information included in the header 232 to route the frame from the target port to the initiator or source port in accordance with, respectively, the DID and SID of 232. In one embodiment in accordance with a version of the FC protocol, the login acceptance or response frame 230 may be an instance of a PLOGI_ACC frame as specified in the standard. An embodiment as described herein may include code executing in the target or receiving system (such as code of one or more drivers) to select a target WWN to be used for a logical connection being established as a result of a particular login frame and corresponding login acceptance or response frame.

Code executing in the initiator system selects a WWN of the initiator or source port to be used and includes the selected WWN in the payload 224 of the login frame transmitted to the target FA port having the address of DID as indicated in the login frame header portion 222. In the example 200, the foregoing selected WWN of the SID for the logical connection being established using a particular login frame instance is referred to as the source WWN. In accordance with an embodiment using the techniques herein, code included in a driver in communication with the initiator FA may have a predefined or reserved set of WWNs from which it can select one for use with a logical connection to the destination or target FA port. As will be described in more detail elsewhere herein, the selected source WWN is associated with the initiator or source FA port (SID) by both code included in the initiator and target systems for use with techniques herein for the physical connection.

In one embodiment, the source WWN selected may be unique across all WWNs of a switch domain. In other words, the selected source WWN may be unique with respect to any WWN selected for use with any other initiator or source FA and also with respect to any target WWN associated with a destination XID (DID). As a variation to the foregoing, WWNs selected as source WWNs may be unique with respect to all possible WWNs in just the source system. Similarly, WWNs selected as target WWNs may be unique with respect to all possible WWNs in just the target system so that a same WWN may be used as both a source WWN and target WWN at a point in time. In any case, the combination of source WWN-target WWN is unique at least per physical connection in order to enable distinguishing logical connections thereon.

In an embodiment, a range of source WWNs used on the initiator or source system may be partitioned into one or more non-overlapping or mutually exclusive subranges where each such subrange may be used in connection with only one of the initiator FAs. In such a case, each FA on the initiator data storage system that may act as an initiator may have a unique or dedicated subrange of source WWNs for its own use. For each initiator FA, code of the driver may track which WWNs in its allocated subrange are in use. When a subsequent source WWN is needed for use with the initiator FA, the next unused WWN from the subrange for the initiator FA may be selected. For example, if the data storage system 102 (as an initiator system) includes three FAs A1, A2 and A3, and a reserved set of 300 source WWNs denoted (WWN1, WWN2, . . . , WWN300) is allocated for use with the three FAs, then each of A1, A2 and A3 may, respectively, utilize 100 source WWNs (e.g., A1 may use (WWN1, . . . WWN100), A2 may use (WWN101, . . . WWN200) and A3 may use (WWN201, . . . WWWN300). When selecting a source WWN for use with (e.g., associated with) the initiator FA's SID to establish a logical connection on a physical connection, code in communication with the initiator FA may select the next available or unused source WWN in its dedicated subrange. It should be noted that one of the foregoing source WWN subranges may be allocated for exclusive use by each initiator FA (e.g., per SID for use with all physical connections using this SID) or for exclusive use per physical connection (e.g., per SID-DID pair).

In an embodiment in which each WWN is unique with respect to all WWNs used by both source and target systems (such as across an entire switch domain at a point in time), each logical connection established across all physical connections between an initiator system and a target system may have a source WWN and a target WWN where each instance of a source WWN is unique with respect to all other source and target WWNs. Similarly, each instance of the target WWN is unique with respect to all other source and target WWNs. Such an embodiment may be used to further facilitate debugging since a particular logical connection can be more readily identified and distinguished from all other logical connections across all physical connections. However, an embodiment may utilize techniques herein as long as the WWNs selected allow for distinguishing between logical connections on a single physical connection.

In another embodiment, a source or initiator FA may be allocated a dedicated subrange as described above and code in communication with the initiator FA may reuse a same source WWN (e.g., may reuse a set of one or more source WWNs) for one or more physical connections. Furthermore, the code in communication with the initiator FA may use the same source WWN for one or more logical connections over a same physical connection. As an example, code in communication with an initiator FA may select a first WWN to be used as a source WWN for a logical connection on a particular physical connection (e.g., with a particular SID-DID pair). The code of the initiator FA may use the same source WWN to establish multiple logical connections over a same physical connection where each of the logical connections may have the same source WWN and each target WWN of the logical connection (e.g., associated with the same DID of the target FA port) is different. As described elsewhere herein, code in the target data storage system may facilitate selection of a target WWN for a given target FA's DID (e.g., for a physical connection). For a given physical connection, code in communication with an initiator FA (SID) may reuse a same source WWN a predetermined number of times in accordance with a number of possible target WWNs. For example, the initiator system may know that the target FA is associated with a number of target WWNs, N, that are cycled through sequentially when selecting a target WWN for each logical connection. As such, code in the initiator system may use the same source WWN to establish a number of logical connections over a same physical connection in accordance with the number of target WWNs, N.

In an embodiment, a source WWN associated with an SID may be reused with different destination XIDs (DIDs) of the targets identifying different physical connections. For example, a range of source WWNs may be reserved for use with an initiator FA (e.g., a particular SID) where the same source WWN range may be reused by the initiator FA for different DIDs. The foregoing range may be used exclusively by a single initiator FA or the same range may be used by each initiator FA. In such an embodiment, the combination of source WWN and target WWN may be guaranteed to be unique with respect to a single physical connection rather than unique across more than one physical connection.

The target system may also select a target WWN for use in accordance with a variety of different techniques as described herein for selection of a source WWN.

The foregoing are some examples that may be used in an embodiment in connection with an initiator FA when selecting a source WWN and/or a target FA when selecting a target WWN for use with a logical connection being established. As described above for each logical connection, a login frame is transmitted from the source FA to the target FA and login acceptance or response frame is then transmitted from the target FA to the source FA. The selected source WWN may be included in the login frame payload 224. Similarly, the selected target WWN may be included in the login acceptance or response frame payload 234. The particular restrictions and criteria imposed in connection with uniqueness of source WWNs and/or target WWNs may vary with embodiment.

As just described, an embodiment in connection with techniques herein may use a data storage system as an initiator system rather than a host where code of a driver in communication with the FA of the data storage system selects the foregoing source WWN and issues a request for establishing a logical connection to the target data storage system. The request to establish the logical connection results in sending the above-mentioned login frame as illustrated in 220 of FIG. 5 to the target data storage system.

On the target data storage system, the FA associated with the DID in the header 222 receives the login frame having a payload portion which is processed by driver code included in the target data storage system. For example, with reference to FIG. 3, FA1 112a is the initiator FA in the system 102 which sends a login frame to FA2 112b of system 104 to establish a first logical connection over the physical connection between the port of FA 1 112a and the port of FA2 112b.

Figure 6A:
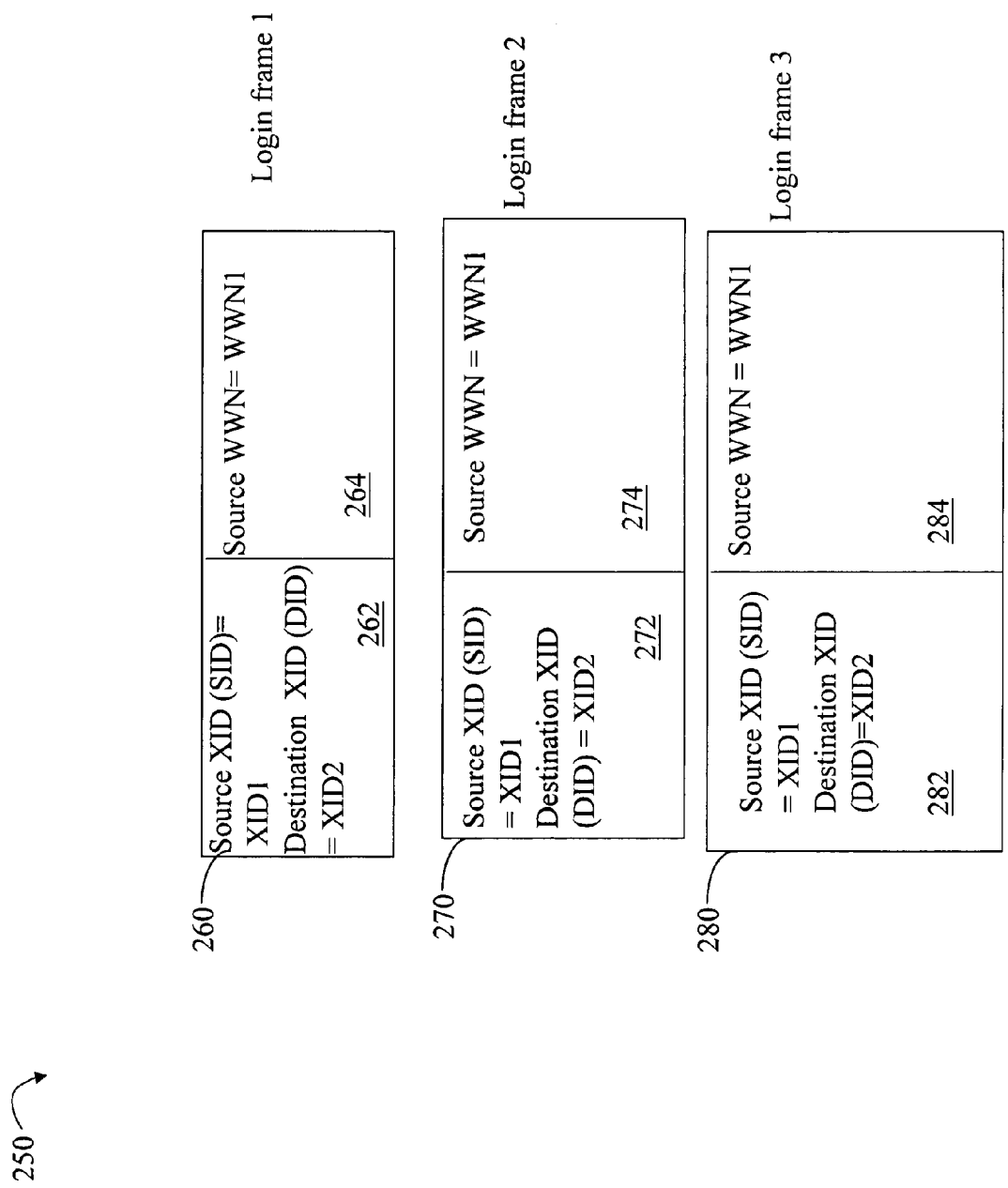
Figure 6B:
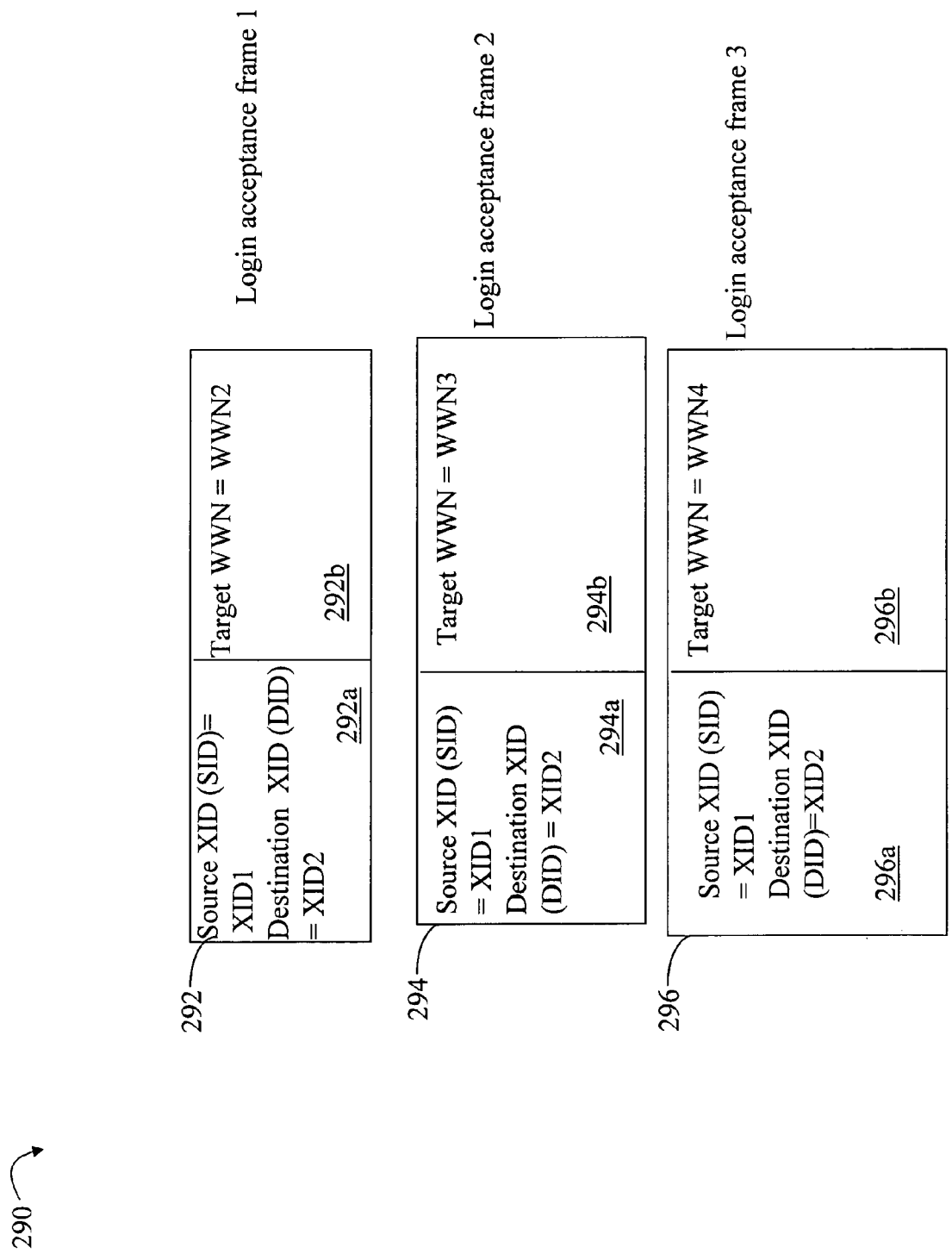

Referring to FIGS. 6A and 6B, shown are three exemplary login frames and corresponding login acceptance or response frames that may be used in an embodiment in connection with techniques herein. The example 250 of FIG. 6A includes the login frames 260, 270 and 280. The example 290 of FIG. 6B includes the login acceptance frames 292, 294 and 296 corresponding, respectively, to login frames 260, 270 and 280. In other words, each of the frames 292, 294 and 296 is sent in response to receiving respective login frames 260, 270 and 280. In this example, the same source WWN=WWN1 is selected for use with establishing 3 logical connections over the same physical connection. The logical connections have different target WWNs as indicated in the login acceptance frames 292, 294 and 296 so that each logical connection over a same physical connection is distinguishable based on the combination of source WWN-target WWN.

Element 260 illustrates a first exemplary login frame that may be sent to establish the foregoing first logical connection between 112a and 112b. In the login frame 260, the header 262 specifies the appropriate routing information used by the switch in routing the login frame from FA 1 112a (XID1) to FA2, 112b (XID2). The driver code 110a of the system 102 selects WWN1 as the appropriate source WWN and includes this in the payload 264 of the login frame 260. On the target data storage system 104, code of driver 110b receives frame 260 and performs processing to select a target WWN for use with the logical connection and returns the selected target WWN in the payload of the login acceptance frame 292. When the target WWN=WWN2 is selected, the target system 104 determines whether the logical connection WWN1-WWN2 has already been specified. If so, then the logical connection may be characterized as a relogin request. Otherwise, if the logical connection WWN1-WWN2 has not already been specified for the physical connection, then this is a login request for a new logical connection between WWN1 associated with XID1 (initiator) and WWN2 associated with XID2 (destination). It should be noted that a difference between a login and a relogin in an embodiment may include that fact that with a relogin, any currently active I/O on that connection may be implicitly aborted. In other words, as described elsewhere herein, outstanding I/O requests for that logical connection may be implicitly aborted and source and/or target systems may perform appropriate cleanup for any outstanding transactions.

Continuing with this example, subsequently, assume FA1 112a as the initiator FA in the system 102 also sends the two additional login frames 270 and 280 to FA2 112b of system 104 to establish, respectively, second and third logical connections over the physical connection between the port of FA 1 112a and the port of FA2 112b.

Figure 7:
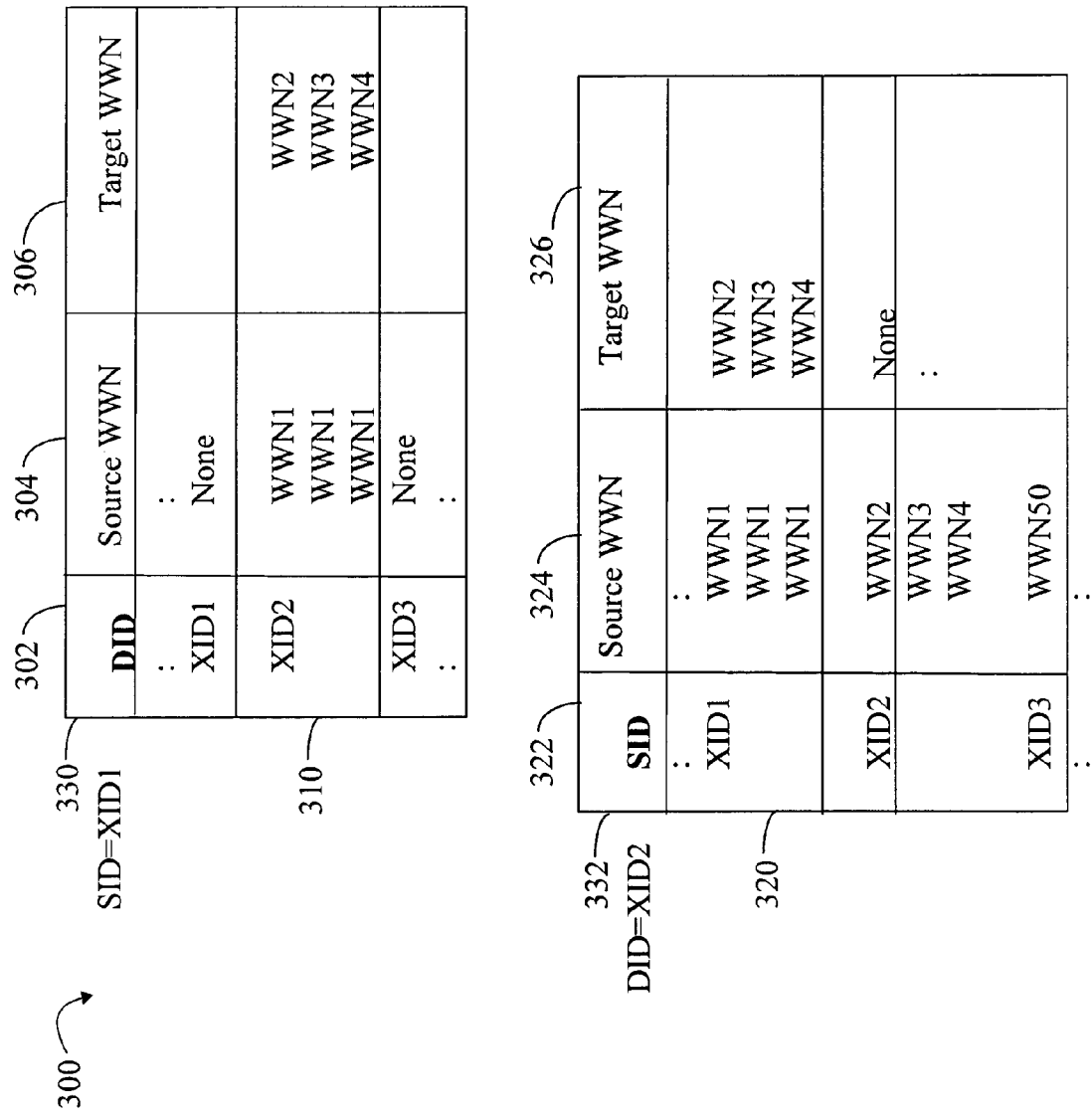

Referring to FIG. 7, shown is an example of information that may be included in a table 330 used by driver code in communication with FA1 112a of the initiator data storage system 102 and information that may be included in a table 332 used by driver code in communication with FA2 112b of the target data storage system 104.

The table 330 may denote what logical connections, if any, are established by an initiator or source FA over a physical connection having a particular XID associated with the target or destination FA port. In this example 300, table 330 may be used by driver 110a communicating with FA 112a as an initiator in tracking which logical connections it has established to what destination ports. Entry 310 describes information regarding the 3 logical connections established using the foregoing 3 login frames of FIG. 6 over the physical connection with SID=XID1 and DID=XID2. The information in table 330 may be stored per SID where the information included in table 330 is for the case where SID=XID1.

The table 332 may denote counterpart information corresponding to table 330 as may be maintained by a driver on the target data storage system. The information in 332 may be used by a driver in communication with an FA in the target data storage system to track the logical connections established where the XID of the FA's port is used as a DID in a physical connection over which one or more logical connections are established. Table 332 may be used by driver 110b communicating with FA2 112b as a target or destination of the 3 logical connections established using the foregoing 3 login frames of FIG. 6 over the physical connection SID=XID1 and DID=XID2. The information in table 332 may be stored per DID where the information included in table 332 is for the case where DID=XID2.

It should be noted that the information in the tables of FIG. 7 may be maintained in separate tables as illustrated as well as stored in combination with other information (e.g., such as illustrated in FIG. 4) that may be used in an embodiment. Although not illustrated and described herein, other messages than as described herein may be exchanged between the initiator and target data storage system in accordance with the FC protocol. For example, other response or acknowledgement messages may be sent from the target to the initiator data storage system in response to receiving particular frames.

Figure 8:
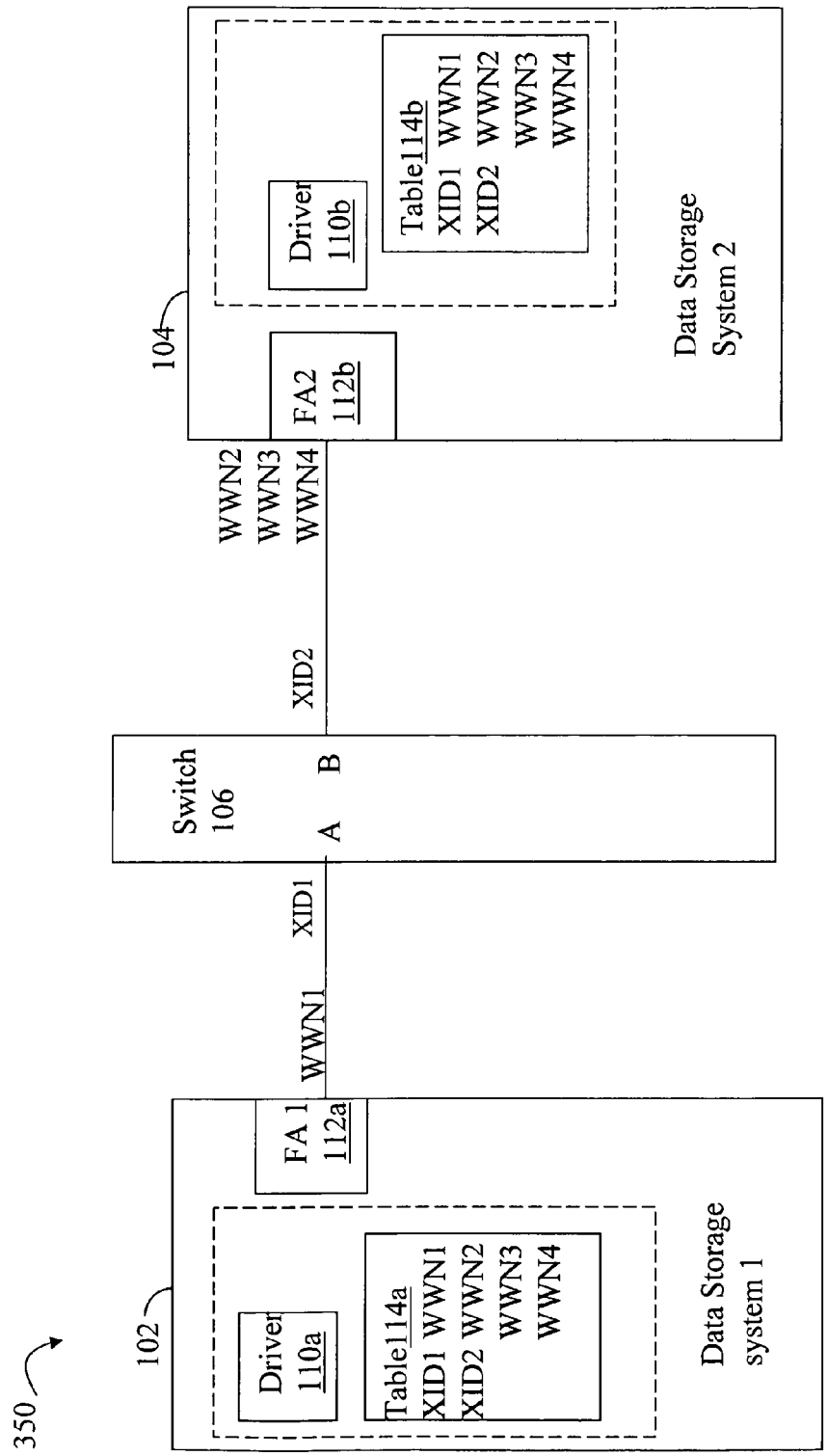
FIG. 8 is an example illustration of an embodiment of the system of FIG. 3 having multiple logical connections over a single physical connection in accordance with techniques herein.

Referring to FIG. 8, shown is an example illustrating the result of sending the 3 login frames of FIGS. 6A and 3 login acceptance or response frames of FIG. 6B as described above successfully establishing the 3 logical connections over a single physical connection. The example 350 illustrates the 3 logical connections denoted by source and target WWN pairs as (WWN1-WWN2), (WWN1-WWN3) and (WWN1-WWN4) over the physical connection denoted by the single SID-DID pair (XID1-XID2). It should be noted that each pair of source WWN and target WWN selected for use with a logical connection is unique with respect to other such WWN pairs used for other logical connections on a same physical connection between the two systems. As described elsewhere herein, the level of uniqueness with respect to source and/or target WWNs used in an embodiment may vary so long as at least the different logical connections on a same physical connection are distinguishable from one another.

As just described, the use of one or more target WWNs for each DID (XID for a destination or target FA port) and the use of one or more source WWNs for each SID (XID for a an initiator or source FA port) may be used in establishing one or more logical connections over a physical connection from an initiator FA port of the initiator data storage system to a destination or target FA port of the target data storage system. Thus, the single physical FC port having a DID may appear and be used as one or more multiple logical or virtual ports each having its own WWN. Similarly, a single physical FC port having an SID may appear and be used as one or more multiple logical or virtual ports each having its own WWN.

Establishing a logical connection, such as through transmission of a login frame and corresponding login acceptance or response frame, is necessary prior to sending other messages using the logical connection such as other messages for I/O requests (e.g., read and write requests). Exemplary I/O frames as may be used in connection with I/O requests are described below.

Figure 9:
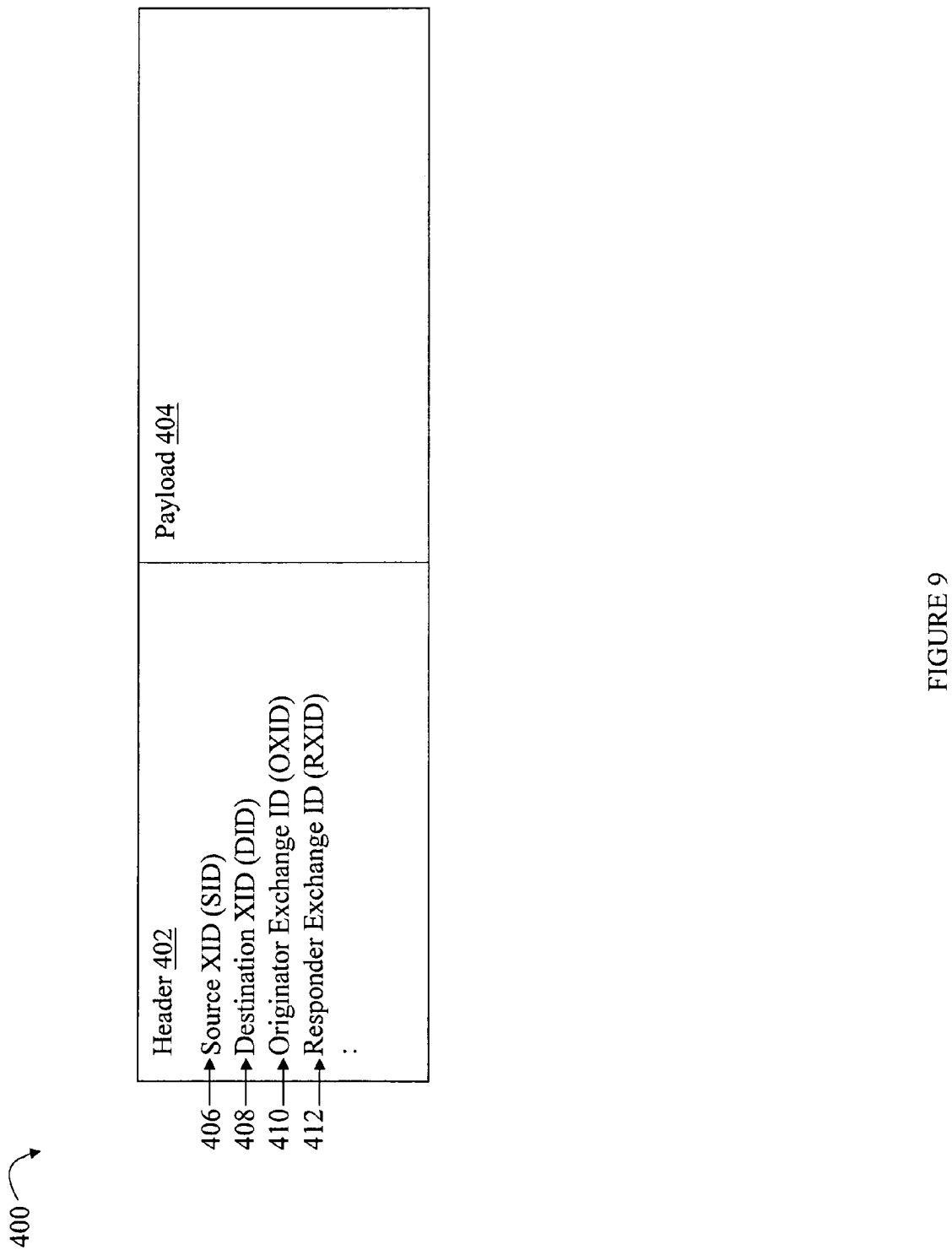
FIG. 9 is an example of a frame that may be transmitted in accordance with techniques herein.

Referring to FIG. 9, shown is an example representation of an I/O frame that may be sent over an established logical connection in accordance with techniques herein. The example 400 provides an illustration of a general format of a I/O frame including a header portion 402 and a payload portion 404. As with the exemplary login and login response or acceptance frames described herein, the I/O frame may also include additional information in the header 402, payload 404 as well as additional portions than as illustrated herein depending on the particular details of the FC or other protocol in an embodiment. The I/O frame that may be used in an embodiment may be as specified in a version of the FC protocol.

The header portion 402 may include the SID 406, DID 408, originator exchange ID (OXID) 410, and responder exchange ID (RXID) 410. The payload 404 may vary with the particular I/O command being implemented (e.g., such as a read or write command). The SID 406 and DID 408 are as described above. The OXID 410 may be generated, selected, and used by the initiating system in maintaining its local state information. The OXID 410 may be used, for example, by the initiating or source data storage system to track ongoing and/or outstanding transactions between the initiating data storage system and the target data storage system. Similarly, the RXID may be generated, selected and used by the target system in maintaining its local state information to similarly track ongoing transactions between the initiator and target systems. The RXID field of a first I/O frame for each new exchange or transaction transmitted from an initiator is blank and is subsequently populated by the target system (e.g., by the driver in communication with the responder or target FA port in the target system). As an example, a unique OXID and a unique RXID may be used for each transaction or exchange such as each read I/O request, write I/O request, and the like. The OXID and RXID may be used, respectively, by the initiator and target data storage systems for tracking the transmissions associated with each such request. For example, the OXID may be unique with respect to all outstanding exchanges for a single initiator FC port (e.g., same OXID may be used by different initiator FC ports or SIDs), or may be unique with respect to all exchanges in the initiator system. Similarly, the RXID may be unique, for example, with respect to all outstanding exchanges for a single target FC port (same RXID may be used for multiple target FC ports or DIDs), or unique with respect to all exchanges in the target system.

Additionally, the OXID and RXID may be used, respectively, by the initiator and target systems to determine the logical connection over which the I/O frame is transmitted. For example, the state information maintained for a particular OXID or RXID may identify the associated logical connection over which the I/O frame (and other frames for this exchange) is transmitted. Each of the OXID and RXID may be used, respectively, by the initiator and target systems to index and locate corresponding state information including the logical connection.

In one embodiment, a range or a number of OXIDs and RXIDs may be allocated for use with each logical connection, for example, such as each login frame is processed (e.g., as a login frame is transmitted from the source or initiator system and when the login frame is received by the target system). At any point in time, any two logical connections on a same physical connection may have different OXID ranges and different RXID ranges (e.g., each logical connection on a physical connection is assigned an OXID range which is exclusive or non-overlapping with respect to any other OXID ranges assigned to other logical connections on the same physical connection. The foregoing is similar for RXIDs). For example, when a login frame is created and transmitted by the initiator data storage system, a predefined number or range of OXIDs may be allocated for use with the logical connection being established with the login frame. Similarly, the target system receiving the login frame may allocate a predefined number or range of RXIDs for use with the login connection being established for the received login frame. As an alternative, the initiator data storage system may allocate a range of OXIDs for a logical connection in response to receiving a login acceptance or response frame rather than when the corresponding login frame is transmitted. The initiator and target systems, respectively, may then select a next unused or available ID in the sequence of OXIDs and RXIDs as needed for each logical connection (e.g., for each I/O frame of a new exchange or transaction, a next ID from those allocated for the logical connection may be selected in a round robin manner). The OXIDs and RXIDs allocated for use with a single logical connection may be selected, for example, from a range of identifiers assigned for exclusive use with an XID (e.g., per each SID and each DID) of the corresponding physical connection on which the logical connection exists. The OXIDs allocated for use with a single logical connection may be selected, for example, from a range of OXID identifiers associated with an initiator FA or initiator FA port (SID) where the range is unique or exclusive with respect to other ranges associated with other SIDs in the initiator system (e.g., an OXID cannot be reused with different SIDs). In another embodiment, the OXIDs allocated for use with a single logical connection may be selected, for example, from a range of OXID identifiers associated with an initiator FA or initiator FA port (SID) where the same range may be used by another SID (e.g., an OXID can be reused for different SIDs but is unique with respect to other OXIDs for the same SID).

Similarly, the RXIDs allocated for use with a single logical connection may be selected, for example, from a range of RXID identifiers associated with a target FA or target FA port (DID) where the range is unique or exclusive with respect to other RXID ranges associated with other DIDs in the target system (e.g., an RXID cannot be reused with different DIDs). In another embodiment, the RXIDs allocated for use with a single logical connection may be selected, for example, from a range of RXID identifiers associated with a target FA or target FA port (DID) where the same range may be used by another DID (e.g., an RXID can be reused for different DIDs but is unique with respect to other RXIDs for the same DID).

The initiator and target systems may use any suitable technique in selecting and determining the OXIDs and RXIDs so long as the OXID and RXID included in an I/O frame may be used to uniquely identify the exchange or transaction on the respective system to the degree of granularity desired and, when needed, to identify the logical connection over which the I/O frame is transmitted. If both the initiator and target systems have an implicit understanding regarding the ranges of OXIDs and/or RXIDs associated with each newly created logical connection, both systems can implicitly determine or map an OXID and/or RXID to the associated logical connection over which the I/O frame is transmitted.

Figure 9A:
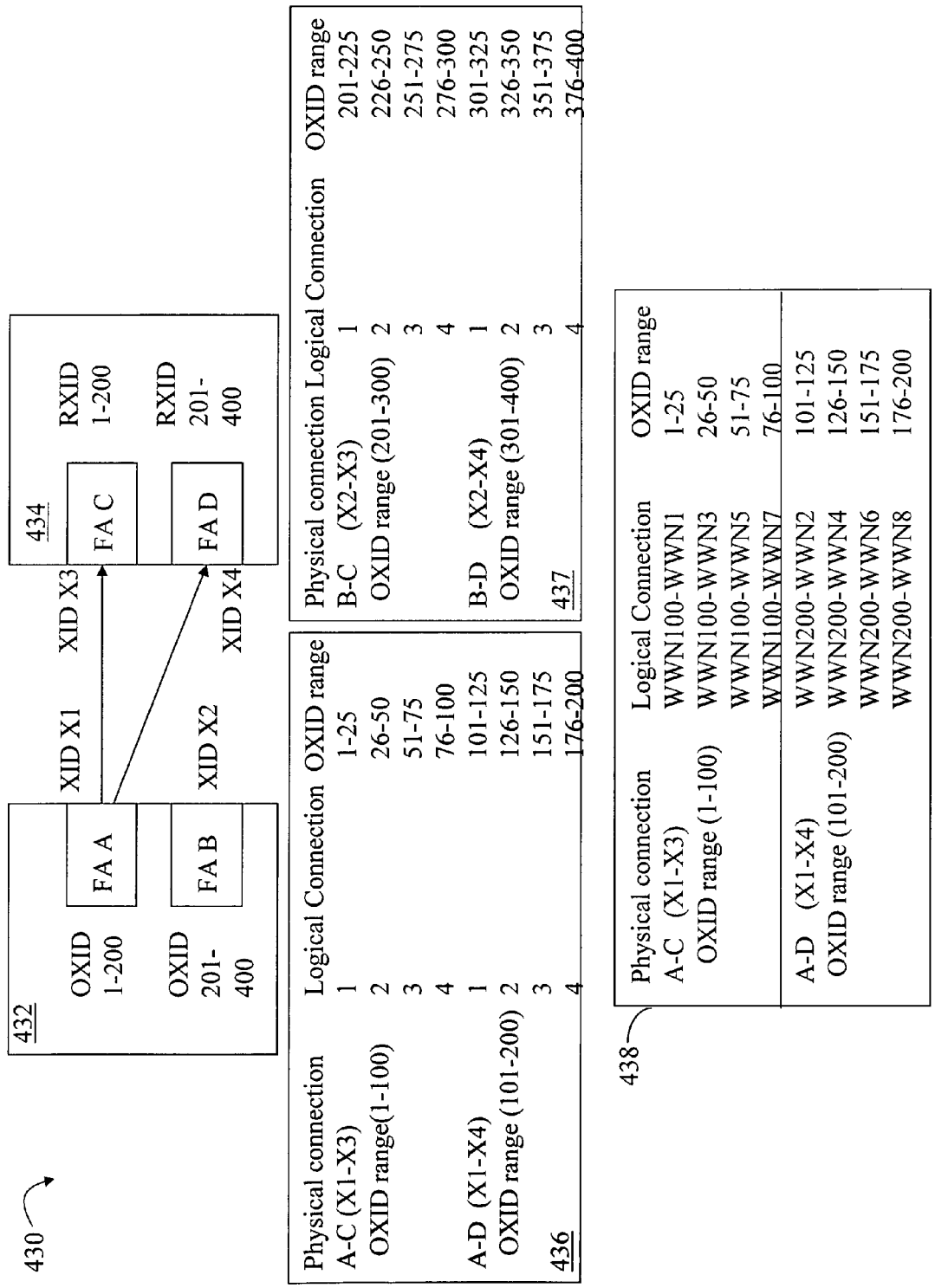
FIG. 9A is an example illustrating use of predetermined OXID and RXID ranges for physical and logical connections in an embodiment in accordance with techniques herein.

To further illustrate with reference to FIG. 9A, suppose the initiator system 432 includes two FAs, A and B, each having a single port and associated XIDs (SIDs), respectively, X1 and X2, and the target system 434 includes two FAs, C and D, each having an a single port and associated XIDs (DIDs), respectively X3 and X4. In this example, the range of OXIDs may be partitioned into a number of exclusive or non-overlapping OXID ranges in accordance with the number of XIDs (SIDs) in the system 432. The range of RXIDs on the target system 434 may be similarly partitioned into exclusive or non-overlapping ranges in accordance with the number of XIDs (DIDs) in the system 434. A first predefined OXID range 1-200 may be allocated for use with A (SID=X1) and a second predefined OXID range 201-400 may be allocated for use with B (SID=X2). For the case of SID=X1 as illustrated in 236, a first physical connection may be defined by A-C (SID=X1, DID=X2) and a second physical connection may be defined by A-D (SID=X1, DID=X4). For each physical connection, suppose a maximum of 4 logical connections may exist at a time. For each physical connection having an SID=X1, as each logical connection is created (e.g., when the login frame is sent from the system 432 to 434 or when the system 432 receives a login acceptance or response frame), the initiator system 432 may allocate an exclusive portion of OXIDs from its range as illustrated in 436. For each physical connection having an SID=X2, processing may similarly be performed in accordance with the information in 437. The target system 434 may similarly allocate an exclusive portion of RXIDs for each logical connection on a corresponding physical connection (SID-DID) as the login frame for the logical connection is received at the DID and processed on the target system (assuming the processing order of login frames on the target system 434 is performed in the same sequence as on the initiator system 432). Thus, for each OXID range of an initiator FA port (SID), code in the system 432 may associate an exclusive first portion of the OXID range for the SID with each possible physical connection from that SID. For example as illustrated in 436, OXID range 1-200 is associated with A and this range 1-200 may be partitioned into two exclusive OXID portions—(1-100) and (101-200)—each associated with a different physical connection where the SID=X1 for each such physical connection. Additionally, each of the foregoing ranges of 100 OXIDs associated with each physical connection may be further partitioned in accordance with a maximum number of allowable logical connections over the physical connection. For example with reference to 236, the OXID portion 1-100 associated with physical connection A-C (X1-X3) may be partitioned into mutually exclusive or non-overlapping ranges as illustrated across logical connections on the physical connection A-C. The foregoing is merely illustrative of what may be implicitly understood by both the systems 432 and 434 with respect to OXIDs. Code in the target system 434 may perform similar processing with respect to RXIDs when a login frame is received over a particular physical connection.

It should be noted that the foregoing ranges associated with each physical and logical connection are merely illustrative. The ranges do not have to be completely partitioned nor do all partitions of OXIDs and RXIDs have to be equal in number (e.g., different OXID and/or RXID partitions assigned to corresponding logical connections can be of varying sizes with respect to one another). It should also be noted that although the foregoing is illustrated where each of the OXID and RXID ranges associated with each physical connection are mutually exclusive or non-overlapping, an embodiment may also use a same range of identifiers for each physical connection. For example, X1 (A) may be associated with OXIDs 1-200 and X2 (B) may also be associated with OXIDs 1-200. In such a case, code in communication with each initiator FA is still able to uniquely identify an exchange or transaction based on the OXID. Partitioning of the foregoing OXID range (1-200) which is associated with each SID may be accordingly partitioned per physical connection and number of logical connections for each physical partition as described above.

Rather than rely upon the sequential ordering in which each logical connection is created in order to associate a particular OXID range with a logical connection, each initiator and target system may implicitly associate a particular OXID range with a predetermined named logical connection based upon particular WWNs. For example, as illustrated in 438, both initiator and target system may agree that physical connection A-C (SID=X1, DID=X3) may have at most 4 logical connections where the port of FA A (SID=X1) only uses a single source WWN=WWN100 and where the port of FA C (DID=X3) uses target WWNs=WWN1, WWN3, WWN5, and WWN7. Similarly, physical connection A-D (SID=X1, DID=X4) may have at most 4 logical connections where the port of FA A (SID=X1) only uses a single source WWN=WWN200 and where port FA D (DID=X4) uses target WWNs=WWN2, WWN4, WWN6, and WWN8. Thus, independent of when the login frames are received and/or processed by the initiator and target system, the OXID ranges as illustrated in 438 may be understood implicitly and utilized by both systems. It should be noted that the agreement between initiator and target systems regarding implied OXID ranges may be facilitated in a variety of different ways. For example, code executed in each system may have such information encoded therein, may be specified and/or communicated as part of an initialization or configuration file, and the like.

It should be noted that the target system needs to be able to determine the logical connection used when the target system receives the first I/O frame transmitted for a new exchange or transaction over a logical connection. In this case, the RXID field of the I/O frame is blank when received by the target system. From the information in the I/O frame, the target system needs to be able to determine the logical connection. Consider a first embodiment as described above and illustrated in FIG. 9A using predefined exclusive OXID ranges for logical connections where each SID is associated with an OXID range that is non-overlapping or mutually exclusive with respect to other OXID ranges of other SIDs (e.g., an OXID is unique across the initiator system). Also consider a second embodiment which is the same as illustrated in FIG. 9A with a difference that the OXID range for each SID is not guaranteed to be mutually exclusive with respect to other SIDs (e.g., an OXID is not guaranteed to be unique across the initiator system but is unique with respect to all physical connections having a same SID). In other words with reference to FIG. 9A, the same range of OXIDs (e.g., 1-200) is used for XID1 and XID2. In both the first and second embodiments as also described above, the technique for selecting the OXID ranges for each physical and logical connection is implicitly understood by both initiator and target systems. As such, code in communication with each FA in both the initiator and target systems is able to implicitly determine the logical connection for a particular OXID using the OXID based on this understood mapping. In the first embodiment, the OXID may be used alone to determine the particular logical connection. In the second embodiment, a combination of the OXID and SID may be used to determine the particular logical connection. As such, code in communication with each FA in the target system in able to implicitly determine the logical connection for an OXID based on information included in the first transmitted I/O frame for an exchange or transaction from the initiator system where the RXID field is uninitialized.

In an embodiment as described above, the target system receiving the first transmitted I/O frame for an established logical connection may implicitly determine the logical connection based on an implied sequential ordering understood by the initiator and target systems. For example, the initiator system may establish multiple logical connections for a single physical connection in a sequential order based on the order in which the login frames are transmitted to the target. The target system may track and determine the sequential ordering and as the received login frames are processed (assuming the target system receives and processes the login frames in the same order that they were sent from the initiator). It may be understood by both the initiator and target systems that any I/O messages transmitted over the single physical connection are also being transmitted by the initiator system based on this sequential ordering. Thus, both the initiator and target system may implicitly use the sequential ordering in a round robin manner to associate a logical connection with I/O frames subsequently transmitted over the single physical connection. The foregoing sequential ordering or predetermined named WWNs for particular logical connections may be used in an embodiment in connection with techniques herein.

Figure 10:
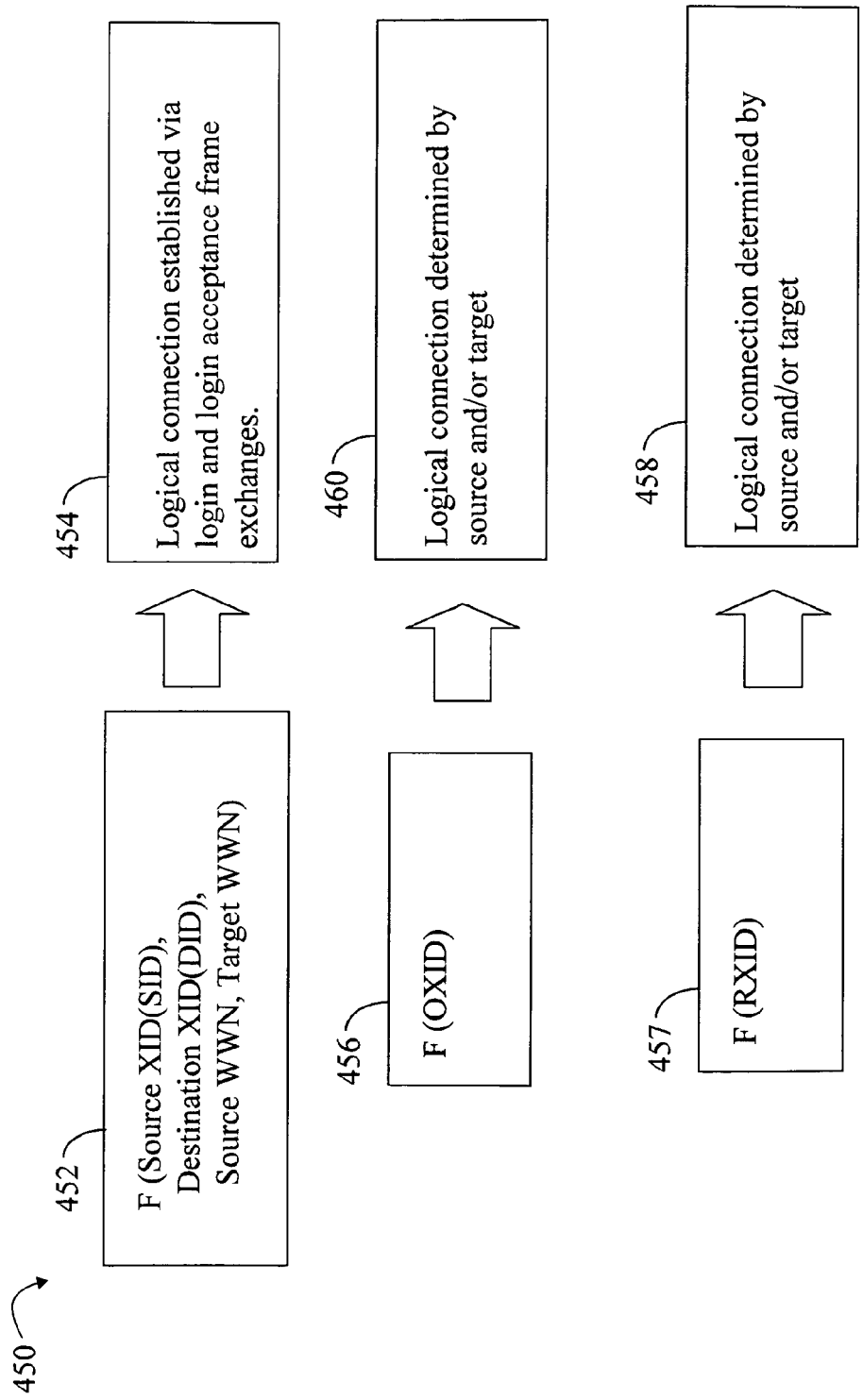
FIG. 10 is an example illustrating how logical connections may be represented in an embodiment in accordance with techniques herein.

Referring to FIG. 10, shown is an example illustrating how determination of logical connections may be represented in an embodiment in accordance with techniques herein. Element 452 represents a mathematical function F having inputs of initiator or source XID (SID), destination XID (DID), source WWN and target WWN. Based on the inputs of 452, the logical connection represented by 454 is established as a result of exchanging a login frame and login acceptance or response frame as described herein between the initiator and target systems. The logical connection may be represented by the source WWN and target WWN over the physical connection defined by SID and DID of the inputs from 452. Element 456 represents a mathematical function F having input OXID for an I/O frame which may be used by code in the initiator or target system (e.g., such as driver code in communication with an FA in either system) to determine the logical connection represented in 460 over a physical connection denoted by the SID and DID in the I/O frame. As described elsewhere herein using predetermined mutually exclusive OXID ranges for each logical connection, element 456 represents how a logical connection may be determined. In a manner similar to determining a logical connection from an OXID, an embodiment may determine a logical connection given an RXID. As described elsewhere herein using predetermined mutually exclusive RXID ranges for each logical connection, element 457 represents how a logical connection may be determined. Element 457 represents a mathematical function F having an input RXID for an I/O frame which may be used by the target system to determine the logical connection represented in 458. As also described herein, if the same OXID range may be used with more than one SID so that a same OXID may be used for two different logical connections, respectively, of two different SIDs, then the OXID in combination with the SID may be used (such as by code of the target system) to determine the particular logical connection and the function F may be represented as F(OXID, SID)=logical connection. In this latter case, as an exemplary illustration with reference to FIG. 9A, the same range of OXIDs, 1-200, may be associated with each possible SID (e.g., OXIDs 1-200 used with X1=SID and OXIDs 1-200 used with X2=SID). The foregoing range of 1-200 may be partitioned into 8 mutually exclusive partitions for each logical connection (4 logical connections per possible physical connection). In this case, driver code in communication with each source or initiator FA may be able to determine the particular logical connection based on only the OXID. Code on the target system may use a combination of the SID and OXID to determine the logical connection based on the foregoing partitions and mapping of OXID ranges to logical connections per physical connection. For example, driver code of FA C (DID=X3) may use a combination of SID and OXID to determine a logical connection based on the foregoing mapping since a same OXID may be associated with physical connection X2-X3 and physical connection X1-X3.

In accordance with a version of the FC protocol, the initiator may logout from one or more logical connections once no further communications are to be sent over the logical connections. In one embodiment using the techniques herein, a LOGO or logout frame as specified in a version of the FC protocol may be sent from the initiator to the target. The logout frame may include information in the header, such as the SID and DID, as described herein in connection with the login frame. In accordance with techniques herein, a logout frame may cause a logout with respect to one or more logical connections over a physical connection as identified by the SID and DID in the logout frame header. In one embodiment, the target receiving a logout frame may logout all logical connections for the identified single physical connection such that all logical connections are implicitly specified. In another embodiment, the target receiving a logout frame may logout a portion of the logical connections on the identified physical connection. The portion of one or more logical connections may be implicit. For example, as described elsewhere herein, the target may track the sequential order in which logical connections are established using login frames. The target may then use the foregoing sequential order to select which predetermined number of established logical connections are logged out as a result of receiving a single logout frame. If a next logout frame is received identifying the same physical connection, a next portion of predetermined logical connections for the identified physical connection may be logged out, and so on, until there are no remaining established logical connections for the physical connection. An embodiment may implement the logout frame in other ways than as described herein. When a logical connection is "logged out", the logical connection may be removed from the information maintained by both the initiator and target systems for a physical connection so that the source WWN is no longer associated with the source port and the target WWN is no longer associated with the target port.

Figure 11:
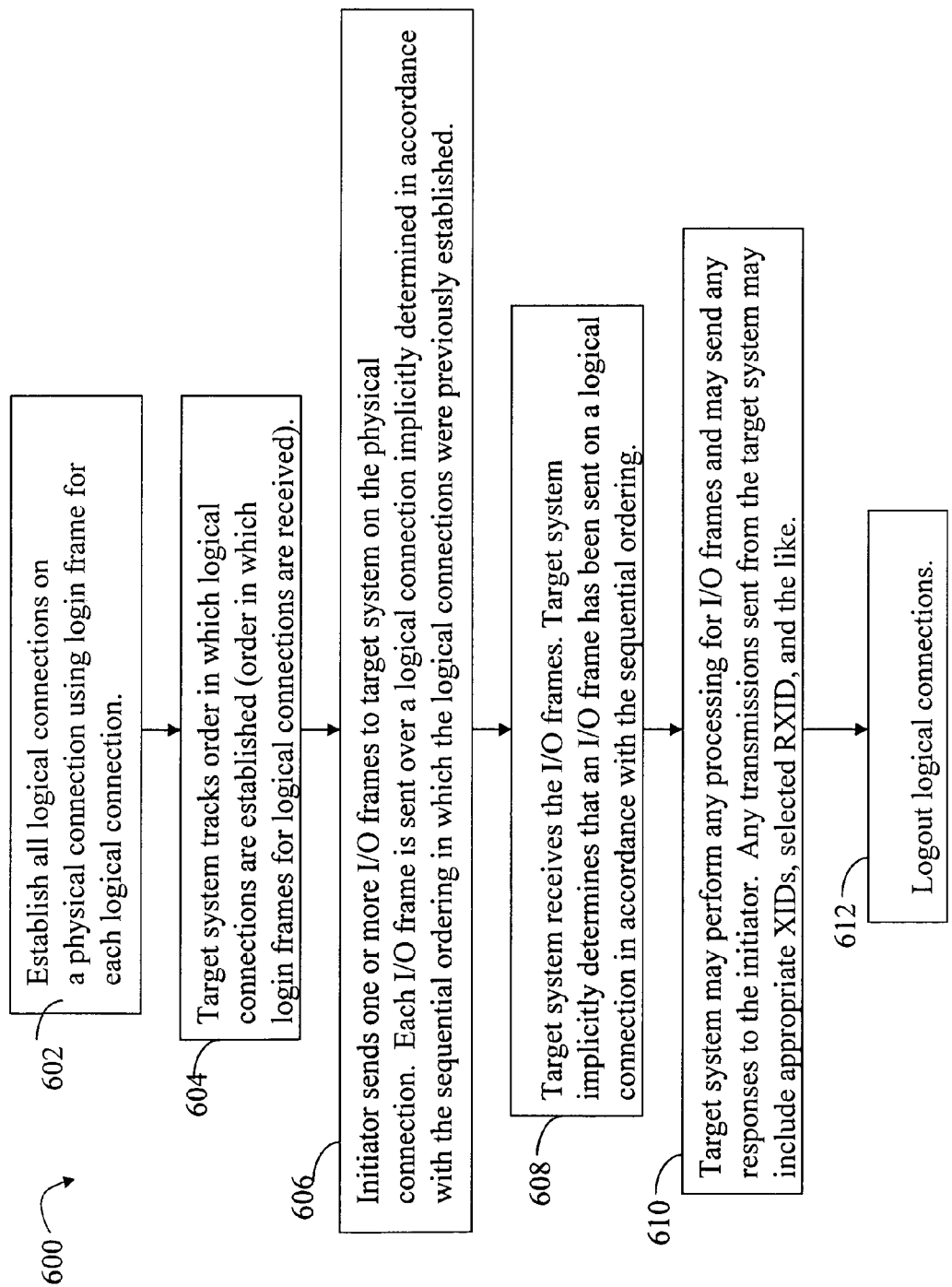
FIGS. 11, 12, 13, 14, 15 and 16 are flowcharts of processing steps that may be performed in an embodiment in accordance with techniques described herein.

Referring to FIG. 11, shown is a flowchart of processing steps that may be performed in an embodiment of a system such as illustrated in FIG. 3 in connection with testing the target data storage system 104. In accordance with techniques herein, the steps of 600 may be performed to establish logical connections to the system 104 using the data storage system 102 as the initiator of such logical connections rather than a host. One or more of the logical connections may be established over a single physical connection. The precise limit or maximum number of allowable logical connections over a single physical connection may vary with embodiment. It should be noted that the processing of the flowchart 600 is described with respect to a single physical connection but an embodiment may perform processing set forth for multiple physical connections in order to establish a desired number of logical connections to the data storage system 104. Additionally, the flowchart 600 may be performed after discovery processing has completed for the data storage systems 102 and 104.

At step 602, an initiator establishes all logical connections on a physical connection by sending a login frame for each logical connection. As described herein, an initiator may be an FA having a port thereof used as the initiator or source (SID) for the physical connection. The initiator (e.g., driver code on the data storage system 102 in communication with the initiator FA) may use the login frame to establish a logical connection to a target FA port (DID) in the data storage system 104. Also, as part of step 602 processing, the target system may send a login acceptance or response frame as described herein for each corresponding received login frame. It is the exchanging of a login frame and a login acceptance or response frame that establishes a logical connection in an embodiment as described herein. At step 604, the target system (e.g., such as using driver code in communication with the target FA) tracks the order in which the logical connections are established over the single physical connection based on the order in which the login frames are received on the data storage system 104. At step 606, the initiator sends one or more I/O frames to the target system on the physical connection. Each I/O frame is sent over a logical connection of the physical connection. In accordance with one embodiment as described herein, the logical connection associated with each transmitted I/O frame may be implicitly determined in accordance with the sequential ordering in which the logical connections were previously established. Each I/O frame includes an OXID which is selected by the initiator using any one of a variety of techniques described herein. The OXID may be used to track state information on the source or initiator data storage system for the associated transaction or exchange. As also described herein, the logical connection over which an I/O frame is assumed to be transmitted may also be determined in other ways. At step 608, the target system receives the I/O frames. The target system may implicitly determine that an I/O frame has been sent on a logical connection in accordance with the foregoing sequential ordering of established logical connections. At step 610, the target system may perform any processing for the received I/O frames and may send any responses to the initiator. Any transmissions sent from the target system may include the appropriate XIDs (SID and DID), selected RXID, and the like. The information included in each transmission may vary with transmission type and standard that may be used in an embodiment. As also described herein, the target data storage system may select and use RXIDs for tracking state information for the corresponding exchange or transaction. The state information may identify the logical connection as defined between WWNs. The RXID may be used to determine a logical connection associated with a particular exchange or transaction through the use of stored state information. At step 612, the logical connections are logged out after all desired transmissions have been sent. As described herein, the logical connections may be logged out by sending one or more logout frames from the initiator to the target. When a logical connection is logged out either using a logout frame or when there is a relogin to the same logical connection, an embodiment may implicitly terminate any outstanding transactions on the logical connection such as, for example, outstanding I/O transactions as may be determined based on OXIDs and RXIDs for this particular logical connection.

The steps of the flowchart 600 describe processing where all logical connections on a single physical connection are established prior to sending any I/O frames. In such a case, the processing may use the sequential ordering in which login frames are processed (logical connections established) to implicitly determine and associate a subsequently transmitted I/O frame with a logical connection. In other words, each I/O frame transmitted over a physical connection is associated with a logical connection thereof in accordance with the sequential ordering of when the login frames for the existing logical connections were previously processed or received by the target system. The foregoing may be utilized in connection with the techniques herein for testing. However, as will be appreciated by those skilled in the art, the techniques herein may be used more generally for emulating hardware functionality to provide multiple logical connections over a single physical connection for other purposes. The techniques herein may be generally used to provide multiple logical connections over a single physical connection without using FAs that support NPIV. The multiple logical connections over single physical connection support may be provided using the techniques herein with software or executable code that emulates such behavior. As will be described below, an embodiment may use another technique besides the sequential ordering to implicitly determine a logical connection for an I/O frame.

Figure 12:
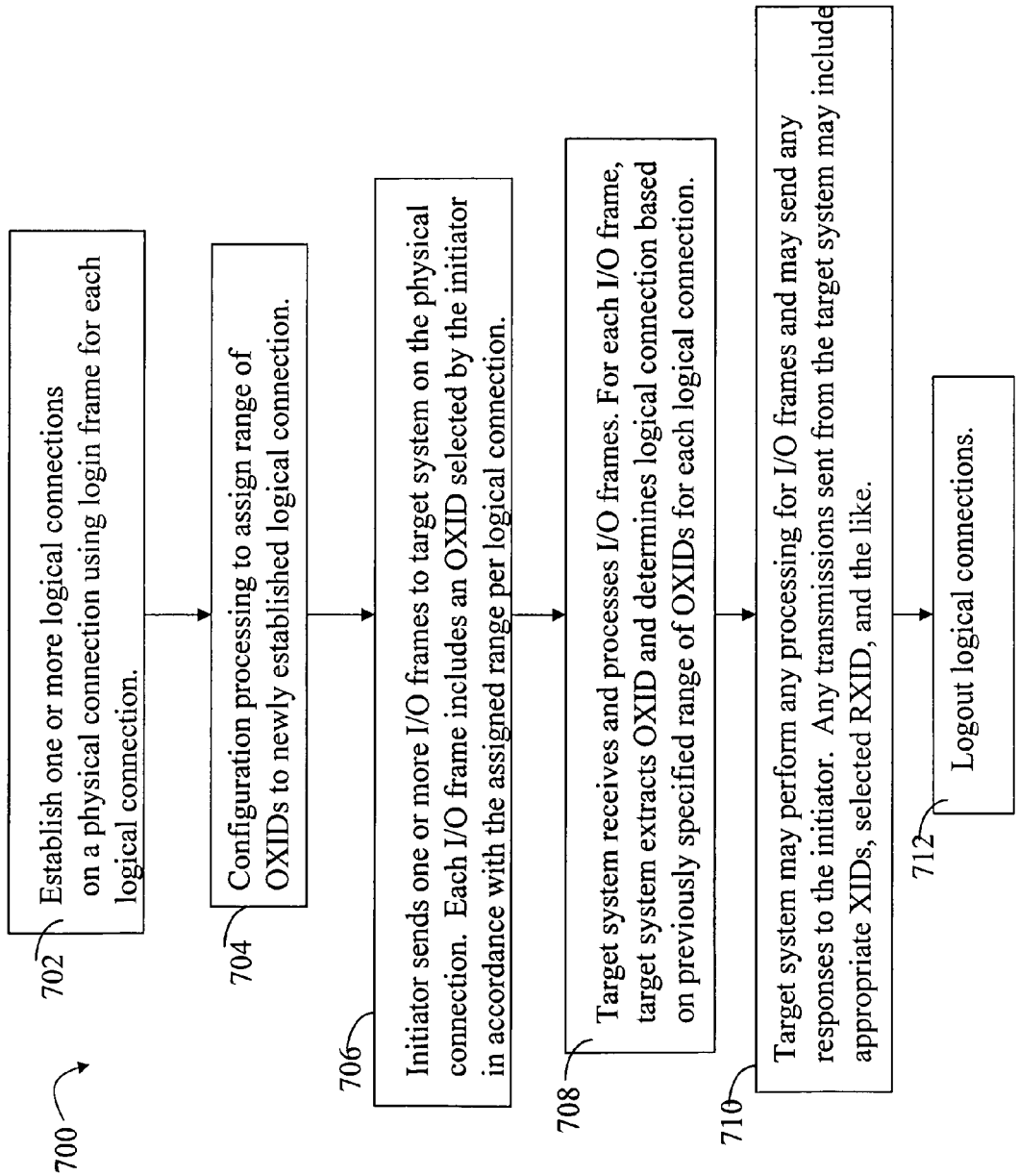

Referring to FIG. 12, shown is a flowchart of processing steps that may be performed in an embodiment in connection with techniques described herein. The steps of 700 describe more general processing that may be used in an embodiment. The steps of 700 do not require that all logical connections be established prior to sending the I/O frames. The steps of flowchart 700 may be performed at different times for different logical connections. In step 702, one or more logical connections may be established on a single physical connection. As each logical connection is established, configuration processing may be performed in step 704 to assign a range of OXIDs and/or RXIDs for exclusive use with the newly established connection. The configuration processing may involve one or more messages being exchanged between the initiator and the target where the range of OXIDs and/or RXIDs for a logical connection may be explicitly specified in one of the transmissions. For example, the initiator may select the range of OXIDs and send a message to accordingly convey this information to the target. The range of OXIDs associated with each logical connection on a physical connection should not overlap and should be exclusive with respect to any other OXID ranges of logical connections on the same physical connection. Additionally, any OXID may be unique with respect to each SID or FA initiator port so that code in communication with each FA may distinguish between exchanges or transactions and uniquely track any associated state information. As an alternative to exchanging one or more messages regarding selected OXIDs and/or RXIDs, an embodiment may implicitly specify a number or range of OXIDs for a newly created logical connection so that no messages are exchanged as part of step 704 configuration processing. The techniques described herein for OXID determination may also be used to similarly determine what RXIDs are used with a logical connection. Examples of how the OXIDs and/or RXIDs may be implicitly specified (or otherwise) per logical connection are described elsewhere herein. At step 706, the initiator may send one or more I/O frames to the target on the physical connection. Each I/O frame includes an OXID selected by the initiator in accordance with assigned range per logical connection. At step 708, the target system receives and processes I/O frames. As part of step 708 for each I/O frame which does not include an RXID, the target system determines the logical connection by extracting the OXID and mapping the OXID to the particular logical connection based upon the assigned range of OXIDs for each established logical connection. As described herein, if a same OXID may be used with two different SIDs, then the OXID in combination with the SID may be used to determine the logical connection when needed. At step 710, the target system may perform any processing for the received I/O frames and send any responses to the initiator. At step 712, one or more logical connection may be logged out. Steps 708, 710 and 712 are respectively similar to steps 608, 610 and 612 of FIG. 11.

Using the steps of flowchart 700, the way in which a logical connection for an I/O frame is determined may be based, for example, solely on the OXID of the I/O frame, based on the OXID and SID included in the I/O frame, and the like. Such processing provides for flexibility and more general applicability of the techniques herein than as illustrated in the flowchart 600 where all logical connections of a physical connection may be determined prior to sending any I/O frames over the physical connection. The steps of FIG. 12 may be performed, for example, in an embodiment with testing as described herein with testing logical connection limits where a data storage system is the initiator as illustrated in FIG. 3. The steps of FIG. 12 may be performed, for example, in an embodiment where one or more hosts serve as initiators establishing connections to a target data storage system. In such embodiments, the host may include the code to perform the techniques herein as an initiator rather than the data storage 102 of FIG. 3.

Following paragraphs and figures summarize in more detail processing described above.

Figure 13:
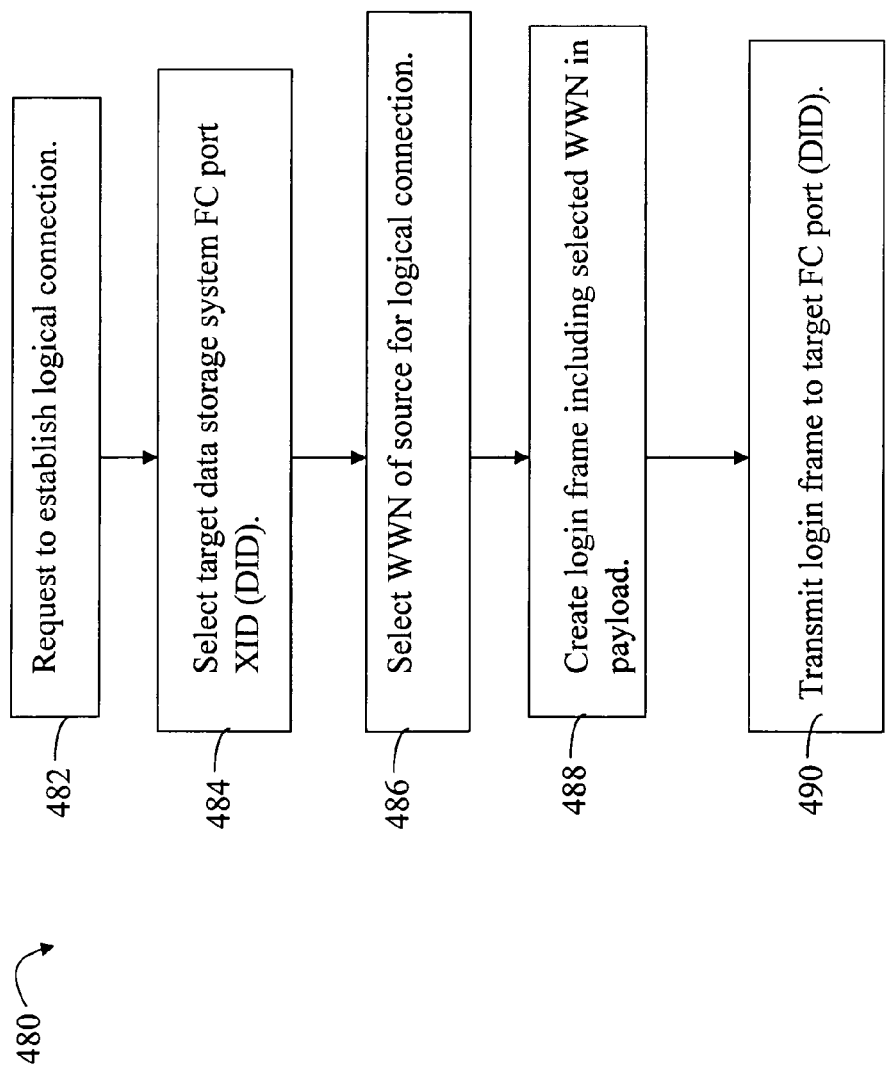

Referring to FIG. 13, shown is a flowchart of processing steps that may be performed by an initiator in accordance with the techniques herein to establish a logical connection. The processing of 480 may be performed, for example, by driver code on an initiator data storage system such as in communication with an FA including the initiator FA port as described above. At step 482, a request may be received to establish a logical connection. At step 484, a target data storage system FC port XID is selected as the DID for the physical connection. At step 486, a source WWN (associated with the XID of the initiator port as the SID of a physical connection) is selected for the logical connection to be established. At step 488, a login frame including the selected source WWN in the payload is created. In step 490, the login frame is transmitted to the DID or target FC port.

Figure 14:
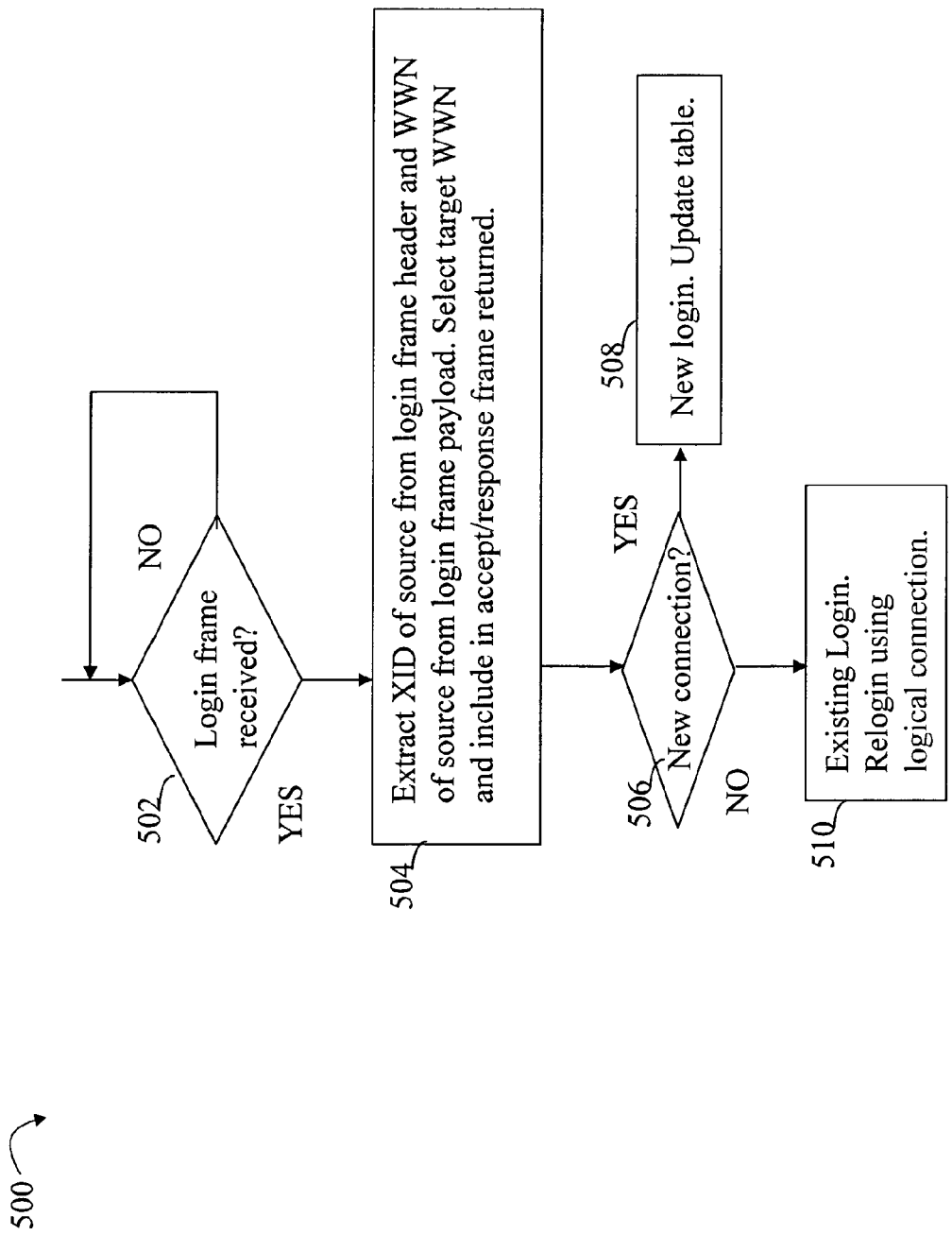

Referring to FIG. 14, shown is a flowchart of processing steps that may be performed by a target data storage system in accordance with techniques herein. The steps of 500 may be performed, for example, by driver code on the target data storage system such as in communication with the FA including the target FA port as described above to process login frames received. At step 502, a determination is made as to whether a login frame has been received. Processing waits at step 502 until a login frame is received and control proceeds to step 504. At step 504, the XID of the initiator (SID) and source WWN of the initiator or source FC port may be extracted from the login frame. As part of step 504, a target WWN is selected by the target system and the logical connection is defined as the source WWN and target WWN over the physical connection SID-DID (as included in the received login frame). The target WWN is returned to the source or initiator system in a login acceptance or response frame. At step 506, a determination is made as to whether this is a new connection (e.g., source WWN-target WWN pair for this particular physical connection not previously specified). If so, processing proceeds to step 508 to perform new login processing. Step 508 may include updating any tables of information maintained on the target for the logical connections and login frame information. If step 506 evaluates to no, control proceeds to step 510 where it is determined that the received login frame is a relogin using a previously specified logical connection (e.g., prior login for the logical connection). Step 510 may include, for example, performing any cleanup processing for outstanding I/O requests for the logical connection for a relogin of the logical connection. It should be noted that when the source or initiator system receives the login acceptance or response frame, similar processing may be performed in accordance with whether this is a new logical connection or a relogin.

Figure 15:
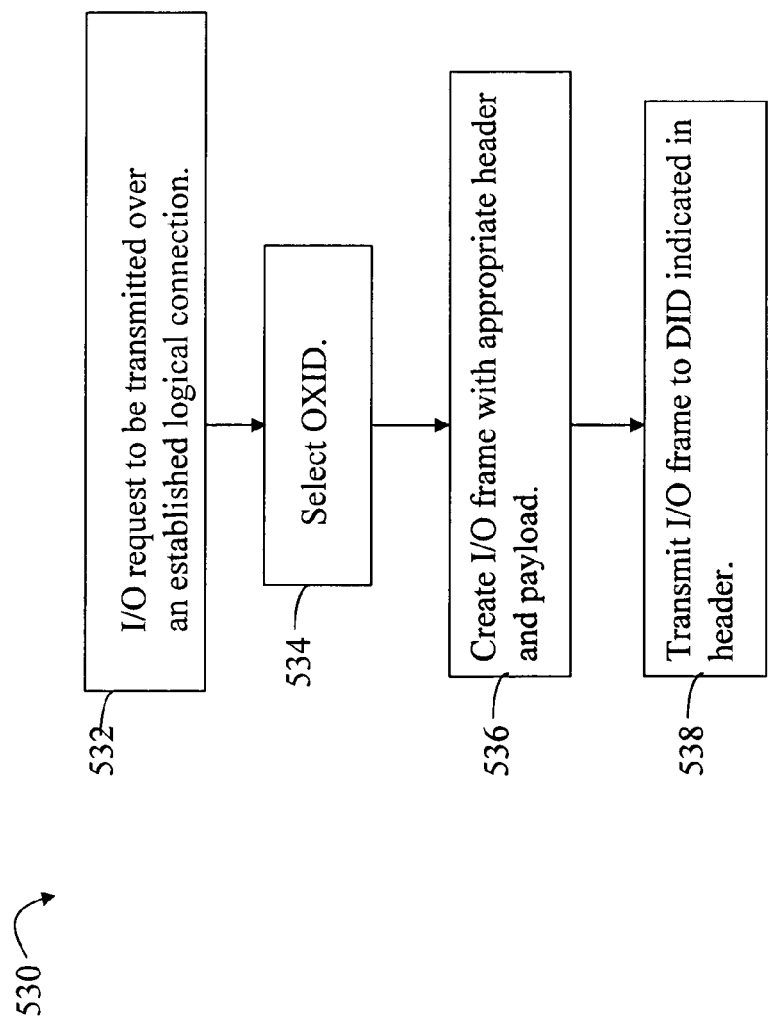

Referring to FIG. 15, shown is a flowchart of processing steps that may be performed by an initiator in connection with transmitting an I/O frame to the target. The steps of 530 may be performed, for example, by code of the driver in the initiator data storage system in communication with an initiator FA (including a port used as an initiator or source endpoint in an established logical connection). At step 532, an I/O request is received on the initiator system to be transmitted over an established logical connection. At step 534, an OXID is selected. At step 536, an I/O frame is created with appropriate header and payload as described herein. At step 536, the I/O frame is transmitted to the DID indicated in the header.

Figure 16:
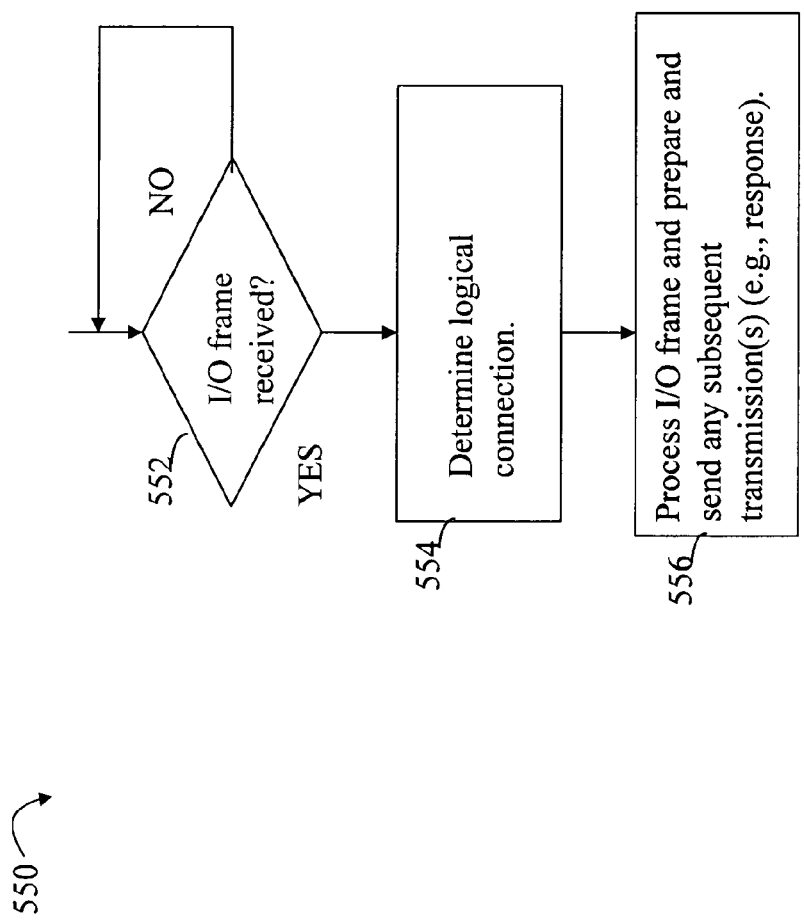

Referring to FIG. 16, shown is a flowchart of processing steps that may be performed by a target system in connection with a received I/O frame. The steps of 550 may be performed, for example, by code of the driver in the target data storage system in communication with the target FA (including port used as a target endpoint in an established logical connection). At step 552, a determination is made as to whether an I/O frame has been received. Processing waits at step 552 until an I/O frame is received and control proceeds to step 554. At step 554, the logical connection for the received I/O frame is determined. The logical connection may be determined in a variety of different ways as described herein and may also vary with whether this I/O frame is the first for a particular exchange or transaction (e.g., no RXID in the I/O frame). For example, the logical connection may be determined based on the extracted OXID, implied sequential ordering based on previously established logical connections, and the like. At step 556, the I/O frame may be processed and any subsequent transmissions for the exchange prepared and sent. Such subsequent transmissions may include, for example, a response sent to the initiator. The foregoing transmission(s) may include the appropriate information such as the OXID, selected RXID, and the like.

It should be noted that an embodiment may establish logical connections in other ways. For example, the source or initiator system may select both the source WWN and target WWN for a connection and communicate this information to the target system using one or more frames. As yet another example, the target system may select both the source WWN and target WWN and communicate this information to the source system using one or more frames in response to a received login frame that may not contain any WWN in the payload.

In connection with the techniques described herein, the source or initiator port may be included in an FA or other hardware component of an initiator system which is in compliance with a version of a protocol or standard (such as for use with Fibre Channel communications) that does not support multiple logical connections over a same physical connection. Similarly, the target port may be included in an FA or other hardware component of the target system which is in compliance with a version of a protocol or standard that does not support multiple logical connections over a same physical connection.

The embodiments described herein provide for virtual ports by selecting a WWN for each such virtual port for a physical port. However, an embodiment may use a WWN or another identifier for each such virtual port.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing a plurality of logical connections over a physical connection comprising:

establishing the plurality of logical connections over the physical connection by transmitting a login frame for each of the plurality of logical connections from an initiator port to a target port, said login frame including a header comprising routing information identifying said physical connection between said initiator port and said target port and a payload comprising an identifier of a virtual port associated with said initiator port, wherein said initiator port is included in a hardware component of an initiator system and said hardware component is in compliance with a version of a protocol that does not support multiple logical connections over a same physical connection.

2. The method of claim 1, wherein said protocol is a version of a fibre channel communications protocol.

3. The method of claim 1, wherein said initiator system is a data storage system and said target port is included in another data storage system.

4. The method of claim 1, further comprising:
for each of said plurality of logical connections, selecting a virtual port associated with said initiator port by selecting an world wide name for said virtual port using code executing on the initiator system which is in communication with said hardware component.

5. The method of claim 3, wherein said another data storage system includes a second hardware component including said target port and said second hardware component is in compliance with a version of the protocol that does not support multiple logical connections over a same physical connection.

6. The method of claim 1, wherein said routing information is used by a switch to route transmissions over the physical connection and said identifier of said virtual port is not used by said switch to route transmissions over the physical connection.

7. The method of claim 1, wherein said identifier of the virtual port is a world wide name.

8. The method of claim 1, wherein said routing information includes a first identifier associated with said initiator port and a second identifier associated with said target port, said first identifier and said second identifier being assigned by a switching fabric used to facilitate communications between said initiator port and said target port.

9. The method of claim 1, wherein an I/O frame is sent over the physical connection, the I/O frame including a header comprising routing information identifying said physical connection and an originator exchange identifier, wherein code executing on a target system including said target port uses said originator exchange identifier to determine upon which one of said plurality of logical connections said I/O frame is sent.

10. The method of claim 1, wherein an I/O frame is sent over the physical connection, the I/O frame including a header comprising routing information identifying said physical connection and an originator exchange identifier, wherein code executing on a target system including said target port implicitly determines on which one of said plurality of logical connections said I/O frame is sent in accordance with a sequential ordering in which said logical connections has been previously established.

11. The method of claim 10, wherein said target system tracks an order in which login frames establishing the plurality of logical connections are processed by said target port, said order being said sequential ordering used to implicitly determine on which one of said plurality of logical connections said I/O frame is sent.

12. The method of claim 9, wherein said I/O frame includes a responder exchange identifier used by a target system including said target port to track state information associated with a transaction, and wherein said originator exchange identifier is used by said initiator system to track state information associated with said transaction.

13. The method of claim 12, wherein said responder exchange identifier is determined by said target system and said originator exchange identifier is determined by said initiator system.

14. The method of claim 3, wherein code executing on the initiator system in communication with said hardware component tracks which logical connections that are established are associated with each physical connection, and wherein code executing on the target system in communication with said second hardware component tracks which logical connections that are established are associated with each physical connection.

15. The method of claim 1, wherein a logout frame is sent from said initiator port to said target port to logout at least a portion of said logical connections, and wherein when a first of said logical connections is logged out, the first logical connection is removed from information maintained on both the initiator system and a target system including said target port for the physical connection so that a world wide name identifying a virtual port of said first logical connection for the initiator port is no longer associated with the initiator port for the physical connection.

16. The method of claim 12, wherein a predetermined number of originator exchange identifiers are associated with each of said plurality of logical connections by code executing in said initiator system as part of processing prior to transmitting a first login frame to said target port for said each logical connection, and wherein a predetermined number of responder exchange identifiers are associated with said each logical connection by code executing in a target system including said target port as part of processing said login frame received from said initiator system to establish a logical connection.

17. The method of claim 1, wherein each of said plurality of logical connections over the physical connection is defined by a first identifier of a first virtual port associated with said initiator port and a second identifier of a second virtual port associated with said target port, and said each logical connection is established as a result of transmitting a first login frame from the initiator port to the target port where the login frame includes a payload with said first identifier, and, in response to receiving said first login frame, a first login acceptance frame is transmitted from said target port to said initiator port wherein said first login acceptance frame includes a payload with said second identifier.

18. A non-transitory computer readable medium comprising executable code stored thereon for providing a plurality of logical connections over a physical connection, said non-transitory computer readable medium comprising executable code for:
establishing the plurality of logical connections over the physical connection by transmitting a login frame for each of the plurality of logical connections from an initiator port to a target port, said login frame including a header comprising routing information identifying said physical connection between said initiator port and said target port and a payload comprising an identifier of a virtual port associated with said initiator port, wherein said initiator port is included in a hardware component of an initiator system and said hardware component is in compliance with a version of a protocol that does not support multiple logical connections over a same physical connection.

19. A non-transitory computer readable medium comprising executable code stored thereon for providing a plurality of logical connections over a physical connection, the non-transitory computer readable medium comprising executable code for:

transmitting a login frame for each of the plurality of logical connections from an initiator port to a target port, said login frame including a header comprising routing information identifying said physical connection between said initiator port and said target port and a payload comprising a first identifier of a virtual port associated with said initiator port; wherein said initiator port is included in a hardware component of an initiator system and said hardware component is in compliance with a version of a protocol that does not support multiple logical connections over a same physical connection; and upon receiving said login frame for said each logical connection, transmitting a login acceptance frame from said target port to said initiator port, said login acceptance frame including a header comprising said routing information and a payload comprising a second identifier of a virtual port associated with said target port, wherein said target port is included in a second hardware component of a target system and said second hardware component is in compliance with a version of a protocol that does not support multiple logical connections over a same physical connection, wherein said each logical connection is established as a result of processing including transmitting said login frame and said login acceptance frame.

20. The non-transitory computer readable medium of claim 19, wherein a relogin is determined by said target system for an existing logical connection and results in implicitly aborting any outstanding I/O transactions for said existing logical connection.

* * * * *